(12) United States Patent
Wagle et al.

(10) Patent No.: US 10,570,324 B2
(45) Date of Patent: Feb. 25, 2020

(54) EMULSIFIER COMPOSITIONS FOR INVERT EMULSION FLUIDS AND METHODS OF USING THE SAME

(71) Applicant: Saudi Arabian Oil Company, Dhahran (SA)

(72) Inventors: Vikrant Wagle, Abqaiq (SA); Abdullah Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/489,854

(22) Filed: Apr. 18, 2017

(65) Prior Publication Data

US 2018/0223165 A1 Aug. 9, 2018

Related U.S. Application Data

(60) Provisional application No. 62/454,189, filed on Feb. 3, 2017, provisional application No. 62/454,192, filed on Feb. 3, 2017.

(51) Int. Cl.
*C04B 24/02* (2006.01)
*B01F 17/00* (2006.01)
(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01);
(Continued)

(58) Field of Classification Search
CPC . C09K 8/48; C09K 8/035; C09K 8/32; C09K 8/36; C09K 8/584
See application file for complete search history.

(56) References Cited

U.S. PATENT DOCUMENTS 2,589,949 A 3/1952 Meadors
2,782,163 A 2/1957 Doyne et al.
(Continued)

FOREIGN PATENT DOCUMENTS

AU 5117264 A 5/1967
CA 2495811 A1 3/2004
(Continued)

OTHER PUBLICATIONS

International Search Report and Written Opinion dated Apr. 3, 2018, pertaining to International Application PCT/US2018/016447, filed Feb. 1, 2018, 14 pages.
(Continued)

*Primary Examiner* — Aiqun Li
(74) *Attorney, Agent, or Firm* — Dinsmore & Shohl

(57) ABSTRACT

Drilling fluid compositions include invert emulsion fluids having an oleaginous phase, an aqueous phase, and an emulsifier composition that includes an ethoxylated alcohol compound and a polyaminated fatty acid compound. The ethoxylated alcohol compound has the formula $R^1$—$(OCH_2CH_2)_n$—OH, where $R^1$ is a hydrocarbyl group having from 8 to 22 carbon atoms and n is from 1 to 8. The ethoxylated alcohol compound has a Hydrophilic-Lipophilic Balance (HLB) of less than or equal to 6. The polyaminated fatty acid compound has the formula $R^2$—CO—NH—$CH_2$—$CH_2$—N(COR$^2$)—$CH_2$—$CH_2$—NH—CO—$R^3$, where $R^2$ is a hydrocarbyl group having from 1 to 20 carbon atoms and $R^3$ is a hydrocarbyl group having 1 to 10 carbon atoms or an alkylene carboxylate group having formula —$R^4$—COOH, where $R^4$ is a saturated or unsaturated hydrocarbylene having from 1 to 10 carbon atoms. Methods of drilling wells include operating a drill in a wellbore in the presence of drilling fluid compositions.

5 Claims, No Drawings

(51) Int. Cl.

| | | |
|---|---|---|
| *C09K 8/035* | (2006.01) | |
| *C09K 8/24* | (2006.01) | |
| *E21B 21/00* | (2006.01) | |
| *C09K 8/22* | (2006.01) | |
| *C09K 8/467* | (2006.01) | |
| *C10M 173/00* | (2006.01) | |
| *C04B 28/02* | (2006.01) | |
| *C04B 28/04* | (2006.01) | |
| *C04B 28/08* | (2006.01) | |
| *C09K 8/74* | (2006.01) | |
| *E21B 43/25* | (2006.01) | |
| *C09K 8/03* | (2006.01) | |
| *C09K 8/20* | (2006.01) | |
| *C09K 8/40* | (2006.01) | |
| *E21B 33/14* | (2006.01) | |
| *C09K 8/08* | (2006.01) | |
| *C09K 8/42* | (2006.01) | |
| *C09K 8/48* | (2006.01) | |
| *C04B 24/08* | (2006.01) | |
| *C09K 8/487* | (2006.01) | |
| *C04B 7/52* | (2006.01) | |
| *C09K 8/46* | (2006.01) | |
| *C09K 8/04* | (2006.01) | |
| *C04B 14/06* | (2006.01) | |
| *C04B 38/02* | (2006.01) | |
| *C10M 105/18* | (2006.01) | |
| *C10M 105/62* | (2006.01) | |
| *C10M 107/34* | (2006.01) | |
| *C10M 111/04* | (2006.01) | |
| *C09K 8/32* | (2006.01) | |
| *C09K 8/36* | (2006.01) | |
| *C10M 173/02* | (2006.01) | |
| *C04B 103/40* | (2006.01) | |
| *C04B 103/46* | (2006.01) | |
| *C04B 111/00* | (2006.01) | |

(52) U.S. Cl.
CPC .... *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin et al. |
| 3,048,538 A | 8/1962 | Rosenberg et al. |
| 3,319,714 A | 5/1967 | Knox |
| 3,353,603 A | 11/1967 | Knight et al. |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert, Jr. et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel |
| 5,474,701 A | 12/1995 | Jaquess et al. |
| RE35,163 E | 2/1996 | Christensen et al. |
| 5,586,608 A | 12/1996 | Clark et al. |
| 5,593,953 A * | 1/1997 | Malchow, Jr. ........... C09K 8/36 507/134 |
| 5,593,954 A | 1/1997 | Malchow |
| 5,602,082 A | 2/1997 | Hale et al. |
| 5,618,780 A | 4/1997 | Argillier et al. |
| 5,728,210 A | 3/1998 | Moran et al. |
| 5,744,432 A | 4/1998 | Barnhorst et al. |
| 5,850,880 A | 12/1998 | Moran et al. |
| 5,996,693 A | 12/1999 | Heathman |
| 6,063,737 A | 5/2000 | Haberman et al. |
| H001932 H | 1/2001 | Heathman et al. |
| 6,258,756 B1 | 7/2001 | Hayatdavoudi |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 10,287,476 B2 | 5/2019 | Al-Yami et al. |
| 10,287,477 B2 | 5/2019 | Al-Yami et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1* | 4/2007 | Navarrete ............. B01F 17/005 507/131 |
| 2007/0191235 A1 | 8/2007 | Mas et al. |
| 2008/0006404 A1 | 1/2008 | Reddy et al. |
| 2008/0194432 A1 | 4/2008 | Heidlas |
| 2008/0171671 A1 | 7/2008 | Mueller et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0306524 A1 | 12/2011 | Smith |
| 2012/0000708 A1 | 1/2012 | van Zanten et al. |

(56) References Cited

U.S. PATENT DOCUMENTS

| | | | |
|---|---|---|---|
| 2012/0018226 A1 | 1/2012 | Nzeadibe et al. | |
| 2012/0241155 A1 | 9/2012 | Ali et al. | |
| 2013/0079256 A1 | 3/2013 | Yang et al. | |
| 2013/0092376 A1 | 4/2013 | Ai-Subhi et al. | |
| 2013/0153232 A1 | 6/2013 | Bobier et al. | |
| 2013/0244913 A1 | 9/2013 | Maberry et al. | |
| 2013/0303410 A1 | 11/2013 | Wagle et al. | |
| 2013/0303411 A1 | 11/2013 | Wagle et al. | |
| 2014/0024560 A1 | 1/2014 | Gonzalez Poche et al. | |
| 2014/0024561 A1 | 1/2014 | Reddy | |
| 2014/0073540 A1 | 3/2014 | Berry et al. | |
| 2014/0102809 A1 | 4/2014 | King et al. | |
| 2014/0121135 A1* | 5/2014 | Gamage | C09K 8/36 507/131 |
| 2014/0213489 A1 | 7/2014 | Smith | |
| 2014/0318785 A1* | 10/2014 | Reddy | C09K 8/36 166/293 |
| 2014/0332212 A1 | 11/2014 | Ayers et al. | |
| 2015/0024975 A1 | 1/2015 | Wagle | |
| 2015/0034389 A1 | 2/2015 | Perez | |
| 2015/0080273 A1 | 3/2015 | Hatchman et al. | |
| 2015/0087563 A1 | 3/2015 | Brege et al. | |
| 2015/0159073 A1 | 6/2015 | Assmann et al. | |
| 2015/0240142 A1 | 8/2015 | Kefi et al. | |
| 2015/0299552 A1 | 10/2015 | Zamora et al. | |
| 2016/0009981 A1 | 1/2016 | Teklu et al. | |
| 2016/0024370 A1 | 1/2016 | Ba geri et al. | |
| 2016/0069159 A1 | 3/2016 | Teklu et al. | |
| 2016/0177169 A1 | 6/2016 | Zhang | |
| 2016/0186032 A1 | 6/2016 | Yu et al. | |
| 2016/0237340 A1 | 8/2016 | Pandya et al. | |
| 2016/0289529 A1 | 10/2016 | Nguyen | |
| 2017/0009125 A1 | 1/2017 | Shaffer et al. | |
| 2018/0223162 A1 | 8/2018 | Al-Yami et al. | |
| 2018/0265763 A1 | 9/2018 | Leotaud et al. | |

FOREIGN PATENT DOCUMENTS

| | | | |
|---|---|---|---|
| CA | 2594108 A1 | 9/2008 | |
| CA | 2810345 A1 | 3/2012 | |
| CA | 2745017 A1 | 12/2012 | |
| CN | 102120158 A | 7/2011 | |
| CN | 101240218 B | 12/2011 | |
| CN | 102041138 B | 12/2011 | |
| CN | 102321461 A | 1/2012 | |
| CN | 102382697 A | 3/2012 | |
| CN | 102373042 B | 8/2013 | |
| CN | 102464974 B | 8/2013 | |
| CN | 103320203 A | 9/2013 | |
| CN | 102500141 B | 1/2014 | |
| CN | 103571599 A | 2/2014 | |
| CN | 102899152 B | 4/2014 | |
| CN | 102899154 B | 4/2014 | |
| CN | 102977940 B | 11/2014 | |
| CN | 104130839 A | 11/2014 | |
| CN | 104559954 A | 4/2015 | |
| CN | 103351925 B | 7/2015 | |
| CN | 102373053 B | 8/2015 | |
| CN | 103571578 B | 8/2015 | |
| CN | 104830513 A | 8/2015 | |
| CN | 104877749 A | 9/2015 | |
| CN | 104910881 A | 9/2015 | |
| CN | 105038737 A | 11/2015 | |
| CN | 103757640 B | 12/2015 | |
| CN | 105112036 A | 12/2015 | |
| CN | 103773041 B | 1/2016 | |
| CN | 105441051 A | 3/2016 | |
| CN | 104449893 B | 5/2016 | |
| CN | 103555304 B | 6/2016 | |
| CN | 105623814 A | 6/2016 | |
| CN | 105778992 A | 7/2016 | |
| CN | 105861135 A | 8/2016 | |
| EP | 0108546 A2 | 5/1984 | |
| EP | 0243067 A2 | 10/1987 | |
| EP | 0265563 A1 | 5/1988 | |
| EP | 0296655 A1 | 12/1988 | |
| EP | 315243 A1 | 5/1989 | |
| EP | 331158 A2 | 9/1989 | |
| EP | 0 395 815 A1 | 11/1990 | |
| EP | 1003829 B1 | 5/2004 | |
| EP | 1213270 B1 | 2/2005 | |
| EP | 2708586 A1 | 3/2014 | |
| GB | 2205748 A | 12/1988 | |
| GB | 2283036 A | 4/1995 | |
| GB | 2 343 447 A | 5/2000 | |
| JP | 07109472 A | 4/1995 | |
| JP | 2006001789 A | 1/2006 | |
| WO | 8911516 A1 | 11/1989 | |
| WO | 9402565 A1 | 2/1994 | |
| WO | 9530818 A1 | 11/1995 | |
| WO | 9640836 A1 | 12/1996 | |
| WO | 9730142 A1 | 8/1997 | |
| WO | 98/36151 | 8/1998 | |
| WO | 9907816 A1 | 2/1999 | |
| WO | 9955634 A1 | 11/1999 | |
| WO | 01/23703 A1 | 4/2001 | |
| WO | 03093641 A1 | 11/2003 | |
| WO | 2004/076561 A1 | 9/2004 | |
| WO | 2006012622 A2 | 2/2006 | |
| WO | 2006/120151 A2 | 11/2006 | |
| WO | 2007003885 A2 | 1/2007 | |
| WO | 2007/118328 A1 | 10/2007 | |
| WO | 2008081158 A2 | 7/2008 | |
| WO | 2009060405 A1 | 5/2009 | |
| WO | 2009138383 A1 | 11/2009 | |
| WO | 2010/030275 A1 | 3/2010 | |
| WO | 2012101594 A1 | 8/2012 | |
| WO | 2012158645 A1 | 11/2012 | |
| WO | 2013055843 A1 | 4/2013 | |
| WO | 2013154435 A1 | 10/2013 | |
| WO | 2014107391 A1 | 7/2014 | |
| WO | 2014164381 A1 | 10/2014 | |
| WO | 2014193507 A1 | 12/2014 | |
| WO | 2015000077 A1 | 1/2015 | |
| WO | 2015006101 A1 | 1/2015 | |
| WO | 2015/038117 A1 | 3/2015 | |
| WO | 2015041649 A1 | 3/2015 | |
| WO | 2016/189062 A1 | 12/2016 | |

OTHER PUBLICATIONS

International Search Report and Written Opinion dated Apr. 20, 2018, pertaining to International Application PCT/US2018/016365, filed Feb. 1, 2018, 16 pages.

International Search Report and Written Opinion dated Apr. 20, 2018, pertaining to International Application PCT/US2018/016414, filed Feb. 1, 2018, 14 pages.

International Search Report and Written Opinion dated Apr. 16, 2018, pertaining to International Application PCT/US2018/016415, filed Feb. 1, 2018, 13 pages.

Non-Final Office Action dated Apr. 30, 2018 pertaining to U.S. Appl. No. 15/586,543, filed May 4, 2017

Non-Final Office Action dated May 1, 2018 pertaining to U.S. Appl. No. 15/496,794, filed Apr. 25, 2017.

Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylates/_jcr_contents/par/tabbedcontent/tab_1780231844/textimage.

Non-Final Office Action dated Jan. 16, 2018 pertaining to U.S. Appl. No. 15/485,479, filed Apr. 12, 2017.

Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.

Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.

(56) References Cited

OTHER PUBLICATIONS

Inoue et al., "Interactions Between Engine Oil Additive", J. Japan Petrol. Inst., 1981, 24 (2), 101-107.
Joshi et al., "Physiochemical Behaviour of Ternary System Based on Coconut Oil/C12/E8/n-pentanol/Water", J. Surface Sci. Technol., 2013, 29 (1-2), 1-13.
Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.
Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.
Min et al., "Research on Coking Dust Wettability of Strong Cohesiveness and Easy Mudding", Safety in Coal Mines, Tsinghua Tongfang Knowledge Network Technology Co., Ltd., 2006.
Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.
Nelson, Erik B., "Well Cementing Fundamentals", Oilfield Review, Summer 2012, vol. 24, No. 2, 59-60, Schlumberger.
Paswan et al., "Development of Jatropha oil-in-water emulsion drilling mud system", Journal of Petroleum Science and Engineering, 2016, vol. 144, p. 10-18.
Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2.pdf (Year:2013).
International Search Report pertaining to International Application No. PCT/US2018/014986, filed Jan. 24, 2018, 8 pages.
Written Opinion pertaining to International Application No. PCT/US2018/014986, filed Jan. 24, 2018, 12 pages.
International Search Report and Written Opinion dated Apr. 3, 2018 for PCT/US2018/016182 Filed Jan. 31, 2018. pp. 1-13.
International Search Report and Written Opinion dated May 25, 2018, pertaining to International Application No. PCT/US2018/016167, filed Jan. 31, 2018, 20 pages.
International Search Report and Written Opinion dated May 29, 2018 pertaining to International Application No. PCT/US2018/015207 filed Jan. 25, 2018, 15 pages.
Office Action pertaining to U.S. Appl. No. 15/489,927 dated Jul. 6, 2018.
International Search Report pertaining to International Application No. PCT/US2018/015191, filed Jan. 25, 2018, 6 pages.
Written Opinion pertaining to International Application No. PCT/US2018/015191, filed Jan. 25, 2018, 8 pages.
International Search Report and Written Opinion dated Mar. 16, 2018 pertaining to International Application No. PCT/US2018/015140.
Non-Final Office Action dated May 4, 2018 pertaining to U.S. Appl. No. 15/628,892, filed Jun. 21, 2017.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.

Non-Final Office Action dated May 25, 2018 pertaining to U.S. Appl. No. 15/485,724, 6 pages.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Notice of Allowance and Fee(s) Due dated May 15, 2019 pertaining to U.S. Appl. No. 15/922,077, filed Mar. 15, 2018, 27 pgs.
Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 68 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Feb. 5, 2019 pertaining to U.S. Appl. No. 15/612,397, filed Jun. 2, 2017, 67 pgs.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
Office Action dated Dec. 12, 2018 pertaining to U.S. Appl. No. 15/581,136, filed Apr. 28, 2017.
Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 16/039,525, filed Jul. 19, 2018, 75 pgs.
U.S. Office Action dated Jul. 2, 2019 pertaining to U.S. Appl. No. 15/586,555, filed May 4, 2017, 92 pgs.
"Tridecyl Alcohol Ethoxylate," 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 24, 2019 pertaining to U.S. Appl. No. 16/037,493, filed Jul. 17, 2018, 31 pgs.
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.

(56) References Cited

OTHER PUBLICATIONS

Examination Report for U.S. Pat. No. 3,052,276 dated Sep. 5, 2019.
Examination Report for Application No. GC2018-34699 dated Aug. 21, 2019.
Examination Report for Application No. GC2018-34711 dated Jul. 28, 2019.
Examination Report for Application No. GC2018-34700 dated Aug. 21, 2019.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Notice of Allowance and Fee(s) Due dated Oct. 11, 2019 pertaining to U.S. Appl. No. 16/037,493, filed Jul. 17, 2018, 17 pgs.
Office Action dated Oct. 22, 2019 pertaining to U.S. Appl. No. 16/039,525, filed Jul. 19, 2018, 32 pgs.
Notice of Allowance and Fee(s) Due dated Nov. 5, 2019 pertaining to U.S. Appl. No. 15/586,555, filed May 4, 2017, 29 pg.
Office Action dated Oct. 23, 2019 pertaining to U.S. Appl. No. 15/660,118, filed Jul. 26, 2017, 45 pgs.
Office Action dated Oct. 24, 2019 pertaining to U.S. Appl. No. 16/202,600, filed Nov. 28, 2018, 84 pgs.

* cited by examiner

EMULSIFIER COMPOSITIONS FOR INVERT EMULSION FLUIDS AND METHODS OF USING THE SAME

CROSS REFERENCES TO RELATED APPLICATIONS

This application claims priority to U.S. Provisional Patent Application Ser. No. 62/454,189 filed Feb. 3, 2017, and to U.S. Provisional Patent Application Ser. No. 62/454,192 filed Feb. 3, 2017, both of which are incorporated by reference herein in their entirety.

TECHNICAL FIELD

Embodiments of the present disclosure generally relate to emulsifier compositions, in particular emulsifier compositions for invert emulsion fluid compositions and to methods for using the invert emulsion fluids.

BACKGROUND

During drilling operations, a drilling fluid, which may also be referred to as drilling mud, is circulated through the wellbore to cool the drill bit, to convey rock cuttings to the surface, and to support the wellbore against collapse of the wellbore and against intrusion of fluids from the formation, among other purposes. Drilling fluids are formulated to exhibit certain fluid characteristics, such as density and rheology, for example, that allow the drilling fluids to perform these functions. Invert emulsion fluids drilling fluids are often chosen for their high performance and low risk in various applications. Invert emulsion fluids exhibit high thermal stability, good shale inhibition, and better reusability compared to water based drilling fluids. Invert emulsion fluids are typically preferred for deep water and extended reach wells because of the lubricity and wellbore stability provided by the invert emulsion fluids.

SUMMARY

Embodiments of the present disclosure are related to emulsifier compositions for invert emulsion fluids and drilling fluid compositions that include the invert emulsion fluids and emulsifier compositions. Embodiments are also related to methods of drilling a subterranean well using the drilling fluid compositions.

According to one or more aspects, an invert emulsion comprises an oleaginous phase, an aqueous phase dispersed in the oleaginous phase, and an emulsifier composition. The emulsifier composition comprises an ethoxylated alcohol compound having formula (I):

$$R^1-(OCH_2CH_2)_n-OH \quad (I)$$

where $R^1$ is a hydrocarbyl group having from 8 to 22 carbon atoms, and n is an integer from 1 to 8. The ethoxylated alcohol compound has a Hydrophilic-Lipophilic Balance (HLB) of less than or equal to 6. The emulsifier composition further comprises a polyaminated fatty acid compound having formula (II):

$$R^2-CO-NH-CH_2-CH_2-N(COR^2)-CH_2-CH_2-NH-CO-R^3 \quad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms.

According to other aspects, an emulsifier composition comprises an ethoxylated alcohol compound having formula (I):

$$R^1-(OCH_2CH_2)_n-OH \quad (I)$$

where $R^1$ is a hydrocarbyl group having from 8 to 22 carbon atoms, and n is an integer from 1 to 8. The ethoxylated alcohol compound has a Hydrophilic-Lipophilic Balance (HLB) of less than or equal to 6. The emulsifier composition further comprises a polyaminated fatty acid compound having formula (II):

$$R^2-CO-NH-CH_2-CH_2-N(COR^2)-CH_2-CH_2-NH-CO-R^3 \quad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms.

In yet another aspect, a drilling fluid composition comprises an invert emulsion comprising an aqueous phase dispersed in an oleaginous phase and an emulsifier composition. The emulsifier composition comprises an ethoxylated alcohol compound having formula (I):

$$R^1-(OCH_2CH_2)_n-OH \quad (I)$$

where $R^1$ is a hydrocarbyl group having from 8 to 22 carbon atoms, and n is an integer from 1 to 8. The ethoxylated alcohol compound has a Hydrophilic-Lipophilic Balance (HLB) of less than or equal to 6. The emulsifier composition further comprises a polyaminated fatty acid compound having formula (II):

$$R^2-CO-NH-CH_2-CH_2-N(COR^2)-CH_2-CH_2-NH-CO-R^3 \quad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms. The drilling fluid composition further comprises a weighting material.

In still other aspects, a method of drilling a subterranean well comprises operating a drill in a wellbore in the presence of a drilling fluid composition comprising a weighting material and an invert emulsion fluid, the invert emulsion fluid comprising an oleaginous phase, an aqueous phase dispersed in the oleaginous phase, and an emulsifier composition. The emulsifier composition comprises an ethoxylated alcohol compound having formula (I):

$$R^1-(OCH_2CH_2)_n-OH \quad (I)$$

where $R^1$ is a hydrocarbyl group having from 8 to 22 carbon atoms, and n is an integer from 1 to 8. The ethoxylated alcohol compound has a Hydrophilic-Lipophilic Balance (HLB) of less than or equal to 6. The emulsifier composition further comprises a polyaminated fatty acid compound having formula (II):

$$R^2-CO-NH-CH_2-CH_2-N(COR^2)-CH_2-CH_2-NH-CO-R^3 \quad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms.

Additional features and advantages of the described embodiments will be set forth in the detailed description which follows, and in part will be readily apparent to those skilled in the art from that description or recognized by practicing the described embodiments, including the detailed description which follows and the claims.

DESCRIPTION

Embodiments of the present disclosure relate to emulsifier compositions and invert emulsion fluids including the emulsifier compositions. An example invert emulsion fluid of the present disclosure includes an oleaginous phase, an aqueous phase dispersed in the oleaginous phase, and an emulsifier composition. The emulsifier composition includes an ethoxylated alcohol compound and a polyaminated fatty acid compound. The ethoxylated alcohol compound has the general chemical formula (I): $R^1$—$(OCH_2CH_2)_n$—OH, where $R^1$ is a hydrocarbyl group having from 8 to 22 carbon atoms, and n is an integer from 1 to 8. The ethoxylated alcohol compound has a Hydrophilic-Lipophilic Balance (HLB) of less than or equal to 6. The polyaminated fatty acid compound has the general chemical formula (II):

$R^2$—CO—NH—$CH_2$—$CH_2$—N($COR^2$)—$CH_2$—
$CH_2$—NH—CO—$R^3$      (II)

where $R^2$ is hydrocarbyl group having from 1 to 20 carbon atoms and $R^3$ is a hydrocarbyl group having 1 to 10 carbon atoms or an alkylene carboxylate group having formula —$R^4$—COOH, where $R^4$ is a saturated or unsaturated hydrocarbylene having from 1 to 10 carbon atoms. It is believed that the combination of the ethoxylated alcohol compound and the polyaminated fatty acid compound of the emulsifier composition produces a synergistic effect that increases the emulsion stability of the invert emulsion fluid.

Further embodiments of the disclosure relate to drilling fluid compositions containing an invert emulsion fluid. The invert emulsion fluids include an aqueous phase dispersed in an oleaginous phase. The invert emulsion fluid also contains an emulsifier composition that includes an ethoxylated alcohol compound of formula (I) and a polyaminated fatty acid compound of formula (II). The synergistic effect between the ethoxylated alcohol compound and polyaminated fatty acid compound in the invert emulsion fluid of the drilling fluid composition may provide increased resistance to barite sag and improved hole-cleaning capabilities to the drilling fluid composition compared to drilling fluids that lack emulsifier composition. Without intent to be bound by any particular theory, it is believed that difference in chemistries between the ethoxylated alcohol compound and the polyaminated fatty acid compound may provide improved packing of the molecules of the ethoxylated alcohol compound and the polyaminated fatty acid compound at the oil-water interface between the aqueous phase and the oleaginous phase compared to emulsifier compositions lacking both the ethoxylated alcohol compound and the polyaminated fatty acid compound. Improved packing of the molecules at the oil-water interface may lead to improved emulsion stability of the invert emulsion fluid. Emulsion stability of the invert emulsion fluid refers to maintaining the properties of invert emulsion fluid over time. In particular, emulsion stability of the invert emulsion fluid refers to maintaining the droplet size of the aqueous phase (discontinuous phase) in the oleaginous phase (continuous phase) by decreasing the tendency of droplets of the aqueous phase to coalesce or flocculate with other droplets of the aqueous phase. For example, the emulsifier composition disclosed herein stabilizes the phase boundary between the aqueous phase and the oleaginous phase of the invert emulsion fluid to prevent the droplets of the aqueous phase from coalescing or flocculating together. Emulsion stability may be assessed by conducting by high temperature/high pressure (HTHP) fluid loss tests on the invert emulsion drilling fluids and observing whether the HTHP filtrate exhibits a single layer or separates into two layers.

The aqueous phase may be any suitable fluid such as water or a solution containing both water and one or more organic or inorganic compounds dissolved in the water or otherwise completely miscible with the water. The aqueous phase in some embodiments may contain water, including freshwater, well water, filtered water, distilled water, sea water, salt water, produced water, formation brine, other type of water, or combinations of waters. In embodiments, the aqueous phase may contain brine, including natural and synthetic brine. The aqueous phase may include water containing water-soluble organic compounds, such as alcohols, organic acids, amines, aldehydes, ketones, esters, or other polar organic compounds for example, or salts dissolved in the water. In some embodiments, the aqueous phase may include salts, water-soluble organic compounds, or both as impurities dissolved in the water. Alternatively, in embodiments, the aqueous phase may include salts, water-soluble organic compounds, or both salts and water-soluble organic compounds to modify at least one property of the aqueous phase, such as the density of the aqueous phase for example. In some embodiments, increasing the amount of salt, water-soluble organic compounds, or both salt and water-soluble organic compounds in the aqueous phase may increase the density of the drilling fluid. In some embodiments, salts that may be present in the aqueous phase may include metal salts such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides or combinations of these, for example.

In some embodiments, the invert emulsion fluid may include an amount of the aqueous phase sufficient to produce a stable invert emulsion in which the aqueous phase remains dispersed in the oleaginous phase. In some embodiments, the invert emulsion fluid may have up to 50 volume percent (vol. %) aqueous phase, based on the total volume of the invert emulsion fluid. In some embodiments, the invert emulsion fluid may include from 5 vol. % to less than 50 vol. % aqueous phase, based on the total volume of the invert emulsion fluid. In some embodiments, the invert emulsion fluid may contain from 5 vol. % to 40 vol. %, from 5 vol. % to 30 vol. %, from 5 vol. % to 20 vol. %, from 5 vol. % to 10 vol. %, from 10 vol. % to 50 vol. %, from 10 vol. % to 40 vol. %, from 10 vol. % to 30 vol. %, from 10 vol. % to 20 vol. %, from 20 vol. % to 50 vol. %, from 20 vol. % to 40 vol. %, from 20 vol. % to 30 vol. %, from 30 vol. % to 50 vol. %, from 30 vol. % to 40 vol. %, or from 40 vol. % to 50 vol. % aqueous phase based on the total volume of the invert emulsion fluid.

The oleaginous phase may be any suitable fluid such as oil or a solution containing both oil and one or more organic or inorganic compounds dissolved in the oil or otherwise completely miscible with the oil. The oleaginous phase may include at least one naturally-derived or synthetically-derived oil. The oleaginous phase of the invert emulsion fluid may include oils derived from petroleum, such as mineral oils, diesel oils, linear or branched olefins, polyolefins, alkanes, paraffins, esters of fatty acids, straight chain, branched or cyclical alky ethers of fatty acids, other petroleum-derived oils, or combinations of any of these. The oleaginous phase may contain esters, ethers, acetals, dialkylcarbonates, hydrocarbons, or combinations of any of these. The oleaginous phase may also include oils derived from animals or plants, such as safra oil, for example. The oleaginous phase may also include other oils, such as but not limited to poly diorganosiloxanes, siloxanes, organosiloxanes, other silicone-based oils, or combinations of these. Other oils in conventional use in invert emulsion fluids for drilling applications are also contemplated by this disclosure for inclusion in the oleaginous phase in the invert emulsion fluid.

The invert emulsion fluid may contain from an amount of the oleaginous phase sufficient for the oleaginous phase to be the continuous phase of the invert emulsion fluid. In embodiments, the invert emulsion fluid may include at least 50 vol. % oleaginous phase based on the total volume of the invert emulsion fluid. In some embodiments, the invert emulsion fluid may include from 50 vol. % to 95 vol. % from 50 vol. % to 90 vol. %, from 50 vol. % to 80 vol. %, from 50 vol. % to 70 vol. %, from 50 vol. % to 60 vol. %, from 60 vol. % to 95 vol. %, from 60 vol. % to 90 vol. %, from 60 vol. % to 80 vol. %, from 60 vol. % to 70 vol. %, from 70 vol. % to 95 vol. %, from 70 vol. % to 90 vol. %, from 70 vol. % to 80 vol. %, from 80 vol. % to 95 vol. %, from 80 vol. % to 90 vol. %, or from 90 vol. % to 95 vol. % of the oleaginous phase based on the total volume of the invert emulsion fluid.

In embodiments, the oleaginous phase may be a continuous oleaginous phase and the aqueous phase may be dispersed in the continuous oleaginous phase. In some examples, the invert emulsion fluid may include a volume ratio of the oleaginous phase to the aqueous phase that is sufficient to provide a stable oil-in-water emulsion. In embodiments, the invert emulsion fluid may have a volume ratio of the oleaginous phase to the aqueous phase of from 50:50 to 95:5, from 50:50 to 90:10, from 50:50 to 85:15, from 50:50 to 80:20, from 50:50 to 75:25, from 55:45 to 95:5, from 55:45 to 90:10, from 55:45 to 85:15, from 55:45 to 75:25, from 55:45 to 70:30, from 60:40 to 95:5, from 60:40 to 90:10, from 60:40 to 85:15, from 60:40 to 80:20, from 60:40 to 75:25, from 60:40 to 70:30, from 65:35 to 95:5, from 65:35 to 90:10, from 65:35 to 85:15, from 65:35 to 80:20, from 65:35 to 75:25, and from 65:35 to 70:30. In some examples, the invert emulsion fluid may have a volume ratio of the oleaginous phase to the aqueous phase of from 50:50 to 95:5. In other examples, the invert emulsion fluid may have a volume ratio of the oleaginous phase to the aqueous phase of from 60:40 to 80:20. In still other examples, the invert emulsion fluid may have a volume ratio of the oleaginous phase to the aqueous phase of about 70:30.

The invert emulsion fluid includes the emulsifier composition. The emulsifier composition may stabilize the invert emulsion fluid such that invert emulsion fluids having the emulsifier composition exhibit increased emulsion stability compared to invert emulsion fluids lacking the emulsifier composition. Drilling fluid compositions that include the invert emulsion fluid with the emulsifier composition also exhibit increased emulsion stability and stability of the internal aqueous phase compared to drilling fluid compositions having invert emulsion fluids lacking the emulsifier composition. The drilling fluid composition having the invert emulsion fluid with the emulsifier composition may further maintain a weighting material of the drilling fluid compositions in an oil-wet state and may facilitate increased control of filtration during drilling operations. As previously described, the emulsifier composition includes the ethoxylated alcohol compound and the polyaminated fatty acid compound.

The ethoxylated alcohol compound has the general formula (I)

where $R^1$ is a hydrocarbyl group and subscript n is 1, 2, 3, 4, 5, 6, 7, 8, 9, 10, 11, 12, 13, 14, or 15. In some embodiments, n is an integer from 1 to 8. In some embodiments, n is 1. The ethoxylated alcohol compound may be a reaction product of a fatty alcohol ethoxylated with ethylene oxide. Ethylene oxide is a cyclic ether having the chemical formula $C_2H_4O$ and may be produced by oxidation of ethylene in the presence of a silver catalyst.

As used in this disclosure, a "hydrocarbyl group" refers to a hydrocarbon radical formed by removing one hydrogen atom from a hydrocarbon compound consisting of carbon atoms and hydrogen atoms. The hydrocarbyl group forms a chemical bond with another chemical group at the carbon atom of the hydrocarbyl group from which the hydrogen atom was removed. In embodiments, $R^1$ may be a saturated or unsaturated hydrocarbyl group, such as a saturated alkyl ($—C_yH_{2y+1}$ where y is the number of carbon atoms in $R^1$), an unsaturated alkyl ($—C_yH_{(2y-2z-4w+1)}$ where y is the number of carbon atoms in $R^1$, z is zero or a number of double bonds in $R^1$, and w is zero or a number of triple bonds in $R^1$), an alkenyl ($—CH=CHC_yH_{(2y-2z-4w+1)}$ where y is zero or an integer greater than zero, z is zero or a number of additional double bonds in $R^1$, and w is zero or the number of triple bonds in $R^1$), or an alkynyl ($—C\equiv CC_yH_{(2y-2z-4w+1)}$ where y is zero or an integer greater than zero, z is zero or the number of double bonds in $R^1$, and w is zero or a number of additional triple bonds in $R^1$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula $—(CH_2)_yCH_3$ and linear alkenyls of formula $—CH=(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^1$ may include a cyclic hydrocarbyl group, such as a phenyl group, cyclohexyl group, or other aromatic or non-aromatic cyclic hydrocarbyl group. $R^1$ may be a linear or branched hydrocarbyl group. $R^1$ may have from 8 to 22 carbon atoms (carbons), such as from 8 to 20 carbons, from 8 to 18 carbons, from 8 to 16 carbons, from 8 to 14 carbons, from 8 to 12 carbons, from 8 to 10 carbons, from 10 to 22 carbons, from 10 to 20 carbons, from 10 to 18 carbons, from 10 to 16 carbons, from 10 to 14 carbons, from 10 to 12 carbons, from 12 to 22 carbons, from 12 to 20 carbons, from 12 to 18 carbons, from 12 to 16 carbons, from 12 to 14 carbons, from 14 to 22 carbons, from 14 to 20 carbons, from 14 to 18 carbons, from 14 to 16 carbons, from 16 to 22 carbons, from 16 to 20 carbons, from 16 to 18 carbons, from 18 to 22 carbons, from 18 to 20 carbons, or 13 carbons. In some embodiments, $R^1$ may be a saturated linear hydrocarbyl group. Alternatively, in other embodiments, $R^1$ may be a branched hydrocarbyl group.

The fatty alcohols from which the ethoxylated alcohol compound is derived may include alcohols having formula $R^1—OH$, in which $R^1$ is a hydrocarbyl group as previously described. For example, $R^1$ may be hydrocarbyl group having from 8 to 22 carbons, such as from 8 to 20 carbons, from 8 to 18 carbons, from 8 to 16 carbons, from 8 to 14 carbons, from 8 to 12 carbons, from 8 to 10 carbons, from 10 to 22 carbons, from 10 to 20 carbons, from 10 to 18 carbons, from 10 to 16 carbons, from 10 to 14 carbons, from 10 to 12 carbons, from 12 to 22 carbons, from 12 to 20 carbons, from 12 to 18 carbons, from 12 to 16 carbons, from 12 to 14 carbons, from 14 to 22 carbons, from 14 to 20 carbons, from 14 to 18 carbons, from 14 to 16 carbons, from 16 to 22 carbons, from 16 to 20 carbons, from 16 to 18 carbons, from 18 to 22 carbons, from 18 to 20 carbons, or 13 carbons. In some embodiments, $R^1$ may be a saturated linear hydrocarbyl group. Alternatively, in other embodiments, $R^1$ may be a saturated branched hydrocarbyl group. In still other embodiments, $R^1$ may be an unsaturated hydrocarbyl group.

The fatty alcohol having formula $R^1$—OH may be a naturally-derived or a synthetically-derived fatty alcohol. The fatty alcohol may be a naturally-occurring fatty alcohol, such as a fatty alcohol obtained from natural sources such as animal fats or vegetable oils. The fatty alcohol may also be a hydrogenated naturally-occurring unsaturated fatty alcohol. Alternatively, the fatty alcohol may be a synthetic fatty alcohol prepared from a petroleum source or other source through one or more synthesis reactions. Non-limiting examples of fatty alcohols may include, but are not limited to capryl alcohol, pelargonic alcohol, decanol (decyl alcohol), undecanol, dodecanol (lauryl alcohol), tridecanol (tridecyl alcohol), myristyl alcohol (1-tetradecanol), pentadecanol (pentadecyl alcohol), cetyl alcohol, palmitoeyl alcohol (cis-9-hexadecenol), heptadecanol (heptadecyl alcohol), stearyl alcohol, nonadecyl alcohol, arachidyl alcohol, other naturally-occurring fatty alcohols, other synthetic fatty alcohols, or combinations of any of these fatty alcohols.

In examples, the fatty alcohol may be a fatty alcohol derived by oligomerization of ethylene derived from a petroleum source, or in other examples, the fatty alcohol may be a fatty alcohol derived by hydroformylation of alkenes followed by hydrogenation of the hydroformylation reaction product. In some embodiments, the fatty alcohol may include a hydrocarbyl group ($R^1$) having from 12 to 14 carbon atoms. Some example ethoxylated alcohol compounds may be prepared from a saturated linear fatty alcohol having a saturated linear hydrocarbyl group $R^1$ with 12 carbon atoms.

The ethoxylated alcohol compound may be made by reacting the fatty alcohol with ethylene oxide at a 1:x molar ratio of the fatty alcohol to the ethylene oxide, where x is from 1 to 15, from 1 to 12, from 1 to 10, from 1 to 8, from 1 to 7, from 1 to 6, from 1 to 5, from 1 to 4, from 1 to 3, from 1 to 2, from 2 to 15, from 2 to 12, from 2 to 10, from 2 to 8, from 2 to 7, from 2 to 6, from 2 to 5, from 2 to 4, from 2 to 3, from 3 to 15, from 3 to 12, from 3 to 10, from 3 to 8, from 3 to 7, from 3 to 6, from 3 to 5, or from 3 to 4. In some embodiments, x is about 1. The ethoxylation reaction may be conducted at an elevated temperature and in the presence of an anionic catalyst, such as potassium hydroxide (KOH) for example. An example ethoxylation reaction may proceed according to the reaction (RXN1).

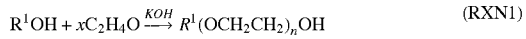  (RXN1)

In the reaction (RXN1), $R^1$ is the hydrocarbon portion of the fatty alcohol previously described in this disclosure. The product of reaction (RXN1) may have the general formula $R^1$—(OCH$_2$CH$_2$)$_n$—OH, where $R^1$ is a hydrocarbyl group having from 8 to 22 carbons, such as from 8 to 20 carbons, from 8 to 18 carbons, from 8 to 16 carbons, from 8 to 14 carbons, from 8 to 12 carbons, from 8 to 10 carbons, from 10 to 22 carbons, from 10 to 20 carbons, from 10 to 18 carbons, from 10 to 16 carbons, from 10 to 14 carbons, from 10 to 12 carbons, from 12 to 22 carbons, from 12 to 20 carbons, from 12 to 18 carbons, from 12 to 16 carbons, from 12 to 14 carbons, from 14 to 22 carbons, from 14 to 20 carbons, from 14 to 18 carbons, from 14 to 16 carbons, from 16 to 22 carbons, from 16 to 20 carbons, from 16 to 18 carbons, from 18 to 22 carbons, from 18 to 20 carbons, or 13 carbons. In some embodiments, x is an integer and n is equal to x.

In some embodiments, $R^1$ is —(CH$_2$)$_m$CH$_3$ where m is from 7 to 21, from 9 to 15, or from 11 to 13. In some embodiments, m is 11, 12, or 13. In some embodiments, the ethoxylated alcohol compound produced from ethoxylation of the fatty alcohol with ethylene oxide at a 1:1 molar ratio of fatty alcohol to ethylene oxide has the chemical formula CH$_3$(CH$_2$)$_m$—(OCH$_2$CH$_2$)—OH; where m is an integer from 11 to 13. In some embodiments, m is 11. In some embodiments, the ethoxylated alcohol compound comprises, consists essentially of, or consists of a compound having the chemical formula CH$_3$(CH$_2$)$_{11}$—(OCH$_2$CH$_2$)—OH.

The Hydrophilic-Lipophilic Balance (HLB) is an empirical relationship between the hydrophilic and the lipophilic portions of a molecule and provides an indication of the relative strength of the hydrophilic portion to the lipophilic portion of the molecule. The ethoxylated alcohol compound may be amphiphilic, meaning that it has a hydrophobic tail (the non-polar R group) and a hydrophilic head (the polar —OH groups from ethylene oxide and the alcohol group) that may lower the surface tension of a liquid or between two liquids. In some embodiments, the surfactant may have a HLB of less than or equal to 6. Without being bound by any particular theory, the HLB of the ethoxylated alcohol compound is the measure of the degree to which the ethoxylated alcohol compound is hydrophilic or lipophilic, which may be determined by calculating values for the regions of the molecules in accordance with the Griffin Method in accordance with Equation 1:

$$HLB = 20 \times \frac{M_h}{M} \quad \text{EQU. 1}$$

In Equation 1, $M_h$ is the molecular mass of the hydrophilic portion of the molecule and M is the molecular mass of the entire molecule. The resulting HLB value gives a result on a scale of from 0 to 20 in which a value of 0 indicates a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble). The ethoxylated alcohol compound has an HLB of less than 6, less than 5, or less than 4. In some embodiments, the ethoxylated alcohol compound may have an HLB of from 0.5 to 6, from 0.5 to 5, from 0.5 to 4, from 0.5 to 3, from 0.5 to 2, from 1 t 6, from 1 to 5, from 1 to 4, from 1 to 3, from 1 to 2, from 2 to 6, from 2 to 5, from 2 to 4, or from 2 to 3.

The polyaminated fatty acid compound has formula (II):

  (II)

where $R^2$ is a hydrocarbyl group and $R^3$ is a hydrocarbyl group or an alkylene carboxylate group having formula —$R^4$—COOH, where $R^4$ is a saturated or unsaturated hydrocarbylene. $R^2$ may be a saturated or unsaturated hydrocarbyl group, such as a saturated alkyl (—$C_yH_{2y+1}$ where y is the number of carbon atoms in $R^2$), unsaturated alkyl (—$C_yH_{(2y-2z-4w+1)}$ where y is the number of carbon atoms in $R^2$, z is zero or a number of double bonds in $R^2$, and w is zero or a number of triple bonds in $R^2$), alkenyl (—CH=CH$C_yH_{(2y-2z-4w+1)}$ where y is zero or an integer greater than zero, z is zero or a number of additional double bonds in $R^2$, and w is zero or the number of triple bonds in $R^2$), or alkynyl (—C≡C$C_yH_{(2y-2z-4w+1)}$ where y is zero or an integer greater than zero, z is zero or the number of double bonds in $R^2$, and w is zero or a number of additional triple bonds in $R^2$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —$(CH_2)_y$ $CH_3$ and linear alkenyls of formula —CH=$(CH_2)_y$ $CH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^2$ may include a cyclic hydrocarbyl group, such as a phenyl group, cyclohexyl group, or other aromatic or non-aromatic cyclic hydrocarbyl group. In embodiments, $R^2$ may be a linear or branched hydrocarbyl group. $R^2$ may have from 1 to 20 carbon atoms (carbons), such as from 1 to 18 carbons, from 1 to 16 carbons, from 1 to 14 carbons, from 1 to 12 carbons, from 1 to 10 carbons, from 6 to 20 carbons, from 6 to 18 carbons, from 6 to 16 carbons, from 6 to 14 carbons, from 6 to 12 carbons, from 6 to 10 carbons, from 8 to 20 carbons, from 8 to 18 carbons, from 8 to 16 carbons, from 8 to 14 carbons, from 8 to 12 carbons, from 8 to 10 carbons, from 10 to 20 carbons, from 20 to 18 carbons, from 10 to 16 carbons, from 10 to 14 carbons, from 10 to 12 carbons, from 12 to 20 carbons, from 12 to 18 carbons, from 12 to 16 carbons, from 12 to 14 carbons, from 14 to 20 carbons, from 14 to 18 carbons, from 14 to 16 carbons, from 16 to 20 carbons, or 13 carbons. In some embodiments, $R^2$ may be a saturated linear hydrocarbyl group. Alternatively, in other embodiments, $R^2$ may be a branched hydrocarbyl group.

As previously described, $R^3$ is a hydrocarbyl group or an alkylene carboxylate group having formula —$R^4$—COOH, where $R^4$ is a saturated or unsaturated hydrocarbylene group. In embodiments, $R^3$ may be a saturated or unsaturated hydrocarbyl group, such as a saturated alkyl (—$C_yH_{2y+1}$ where y is the number of carbon atoms in $R^3$), an unsaturated alkyl (—$C_yH_{(2y-2z-4w+1)}$ where y is the number of carbon atoms in $R^3$, z is zero or a number of double bonds in $R^3$, and w is zero or a number of triple bonds in $R^3$), an alkenyl (—CH=CH$C_yH_{(2y-2z-4w+1)}$ where y is zero or an integer greater than zero, z is zero or a number of additional double bonds in $R^3$, and w is zero or the number of triple bonds in $R^3$), or an alkynyl (—C≡C$C_yH_{(2y-2z-4w+1)}$ where y is zero or an integer greater than zero, z is zero or the number of double bonds in $R^3$, and w is zero or a number of additional triple bonds in $R^3$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —$(CH_2)_yCH_3$ and linear alkenyls of formula —CH=$(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^3$ may include a cyclic hydrocarbyl group, such as a phenyl group, cyclohexyl group, or other aromatic or non-aromatic cyclic hydrocarbyl group. $R^3$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^3$ may be methyl (—$CH_3$), phenyl (—($C_6H_5$)), or other hydrocarbyl.

Alternatively, in other embodiments, $R^3$ may be an alkylene carboxylate group having formula —$R^4$—COOH, where $R^4$ is a saturated or unsaturated hydrocarbylene group, such as an alkylene, alkenylene, or a cyclic hydrocarbylene such as a phenyl group, cyclohexyl group, or other aromatic or non-aromatic cyclic hydrocarbylene. $R^4$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^4$ may be —$CH_2CH_2$—, —CH=CH—, or other hydrocarbylene.

In embodiments, $R^3$ may be selected from the group consisting of methyl, phenyl, —$CH_2CH_2$—COOH, and —CH=CH—COOH. For example, in some embodiments, $R^3$ may have the formula —CH=CH—COOH, such that the polyaminated fatty acid compound has formula (III):

where $R^2$ is hydrocarbyl group having from 1 to 20 carbon atoms. In another example, $R^3$ may have the formula —$CH_3$ such that the polyaminated fatty acid compound has the formula (IV):

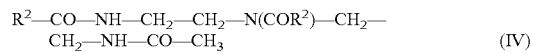

where $R^2$ is hydrocarbyl group having from 1 to 20 carbon atoms. In still another example, $R^3$ may be phenyl (—($C_6H_5$)) such that the polyaminated fatty acid compound has the formula (V):

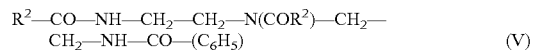

where $R^2$ is hydrocarbyl group having from 1 to 20 carbon atoms. In another example, $R^3$ may have the formula —$CH_3$ such that the polyaminated fatty acid compound has the formula (VI):

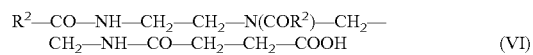

where $R^2$ is hydrocarbyl group having from 1 to 20 carbon atoms.

The polyaminated fatty acid compound may be synthesized by a two-step process. In the first step, a fatty acid is reacted with diethylene triamine (DETA) to produce an amide and water. The fatty acid has the general chemical formula $R^2$—COOH, where $R^2$ is the hydrocarbyl group previously described with respect to formula (II).

The fatty acid having formula $R^2$—COOH may be a naturally-derived or a synthetically-derived fatty acid. The fatty acid may be a naturally-occurring fatty acid, such as a fatty acid derived from natural sources such as animal fats or vegetable oils, for example. The fatty acid may be produced through hydrolysis of triglycerides, phospholipids, or both triglycerides and phospholipids and removal of glycerol. The triglycerides and phospholipids may be derived from natural sources such as animal fats or vegetable fats, such as coconut oil, palm oil, soybean oil, tall oil, tall oil fatty acids (TOFA), or other oil for example. In some examples the fatty acid may be a saturated fatty acid resulting from hydrogenation of a naturally-derived unsaturated fatty acid. Alternatively, the fatty acid may be a synthetic fatty acid prepared from a petroleum source or other source through one or more synthesis reactions. In examples, the fatty acid may be a synthetic fatty acid derived through hydrocarboxylation of alkenes. Non-limiting examples of fatty acids may include, but are not limited to, caprylic acid, capric acid, lauric acid, myristic acid, palmitic acid, stearic acid, arachidic acid, myristoleic acid, palmitoleic acid, sapienic acid, oleic acid, elaidic acid, vaccenic acid, linoleic acid, linoelaidic acid, α-linoleic acid, arachidonic acid, eicosapentaenoic acid, other naturally-occurring fatty acids, other synthetic fatty acids, or combinations of any of these fatty acids. In some embodiments, the fatty acid may be tall oil fatty acid. Tall oil fatty acid may include at least one of palmitic acid, oleic acid, linoleic acid, or combinations of these. In embodiments, the fatty acid may be a tall oil fatty acid derived from distillation of crude tall oil. In one or more embodiments, the fatty acid may include a hydrocarbyl group ($R^2$) having from 12 to 14 carbon atoms. Some example polyaminated fatty acid compounds may be made using a saturated linear fatty acid having a saturated linear hydrocarbyl group $R^2$ with 12 carbon atoms.

In the first reaction step, DETA is reacted with the fatty acid to produce an intermediate fatty acid amide and water. The reaction for the first step in synthesizing the polyaminated fatty acid is provided subsequently in reaction (RXN2).

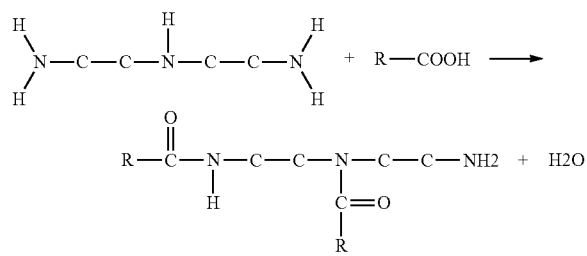

(RXN2)

In the second step of synthesizing the polyaminated fatty acid, the intermediate fatty acid amide synthesized in the first step according to reaction (RXN2) is further reacted with an acid anhydride, such as maleic anhydride, acetic anhydride, benzoic anhydride, or succinic anhydride, for example, to form the polyaminated fatty acid of the second compound. In an example synthesis reaction of the second compound, the acid anhydride may be maleic anhydride. The reaction for the second step using maleic anhydride as the acid anhydride to prepare the compound of formula (III) is provided as reaction (RXN3).

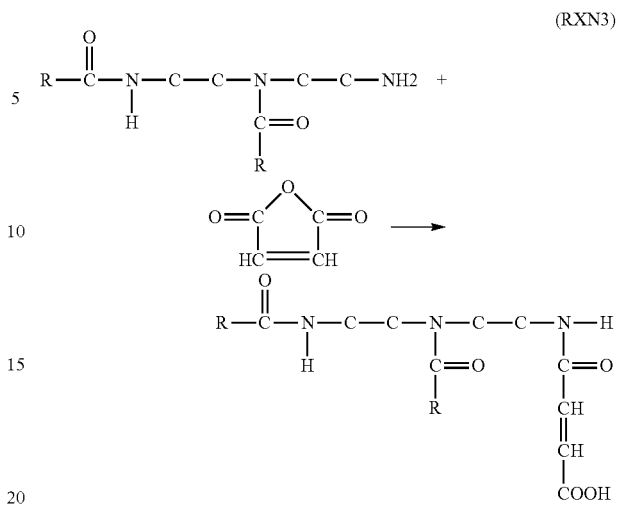

(RXN3)

In an analogous manner to reaction (RXN3), if maleic anhydride in reaction (RXN3) is replaced with acetic anhydride, the product is the compound of formula (IV). Likewise, if maleic anhydride in reaction (RXN3) is replaced with benzoic anhydride, the product is the compound of formula (V). Additionally, if maleic anhydride in reaction (RXN3) is replaced with succinic anhydride, the product is the compound of formula (VI).

The emulsifier composition includes a weight ratio of the ethoxylated alcohol compound to the polyaminated fatty acid compound sufficient to provide stability to the invert emulsion fluid that includes the emulsifier composition. In embodiments, the weight ratio of the ethoxylated alcohol compound to the polyaminated fatty acid compound in the emulsifier composition may be from 1:99 to 99:1, from 1:99 to 95:5, from 1:99 to 90:10, from 20:80 to 99:1, from 20:80 to 95:5, from 20:80 to 90:10, from 50:50 to 99:1, from 50:50 to 95:5, from 50:50 to 90:10, from 70:30 to 99:1, from 70:30 to 95:5, from 70:30 to 90:10, from 80:20 to 99:1, from 80:20 to 95:5, from 80:20 to 90:10, from 85:15 to 99:1, from 85:15 to 95:5, from 85:15 to 90:10, from 90:10 to 99:1, from 90:10 to 95:5, or from 95:5 to 99:1. In some embodiments, the weight ratio of the ethoxylated alcohol compound to the polyaminated fatty acid compound of the invert emulsion fluid, of which the emulsifier composition is a component, may be from 1:99 to 99:1, from 1:99 to 95:5, from 1:99 to 90:10, from 20:80 to 99:1, from 20:80 to 95:5, from 20:80 to 90:10, from 50:50 to 99:1, from 50:50 to 95:5, from 50:50 to 90:10, from 70:30 to 99:1, from 70:30 to 95:5, from 70:30 to 90:10, from 80:20 to 99:1, from 80:20 to 95:5, from 80:20 to 90:10, from 85:15 to 99:1, from 85:15 to 95:5, from 85:15 to 90:10, from 90:10 to 99:1, from 90:10 to 95:5, or from 95:5 to 99:1. In some embodiments, an invert emulsion fluid having only a small amount of the polyaminated fatty acid compound relative to the amount of the ethoxylated alcohol compound exhibits the synergistic effect that results in increased emulsion stability of the invert emulsion fluid compared to invert emulsion fluids lacking the ethoxylated alcohol compound, the polyaminated fatty acid, or both the ethoxylated alcohol compound and the polyaminated fatty acid. For instance, in embodiments for which the amount of polyaminated fatty acid compound is small relative to the amount of the ethoxylated alcohol compound, the invert emulsion fluid may have a weight ratio of the ethoxylated alcohol compound to the polyaminated fatty acid compound of from 70:30 to 99:1, or from 70:30 to 95:5, from 80:20 to 99:1, from 80:20 to 95:5, from 85:15 to 99:1, from 85:15 to 95:5, from 90:10 to 99:1, from 90:10 to 95:5, or from 95:5 to 99:1.

The invert emulsion fluid having the emulsifier composition may have an amount of the ethoxylated alcohol compound and an amount of the polyaminated fatty acid compound sufficient to provide the synergistic effect to stabilize the invert emulsion fluid. The invert emulsion fluid may include from 0.25 pounds per barrel (lbm/bbl) (0.71 kilograms per cubic meter (kg/m$^3$)) to 25 lbm/bbl (71 kg/m$^3$) ethoxylated alcohol compound, where "barrel" refers to a standard oilfield barrel having a volume of 42 U.S. gallons and where 1 pound per barrel is approximately 2.85 kg/m$^3$.

The invert emulsion fluid may include from 0.25 lbm/bbl to 20 lbm/bbl, from 0.25 lbm/bbl to 15 lbm/bbl, from 0.25 lbm/bbl to 8 lbm/bbl, from 0.25 lbm/bbl to 5 lbm/bbl, from 0.25 lbm/bbl to 1 lbm/bbl, from 0.25 lbm/bbl to 0.5 lbm/bbl, from 0.5 lbm/bbl to 25 lbm/bbl, from 0.5 lbm/bbl to 20 lbm/bbl, from 0.5 lbm/bbl to 15 lbm/bbl, from 0.5 lbm/bbl to 10 lbm/bbl, from 0.5 lbm/bbl to 5 lbm/bbl, from 0.5 lbm/bbl to 1 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 8 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 8 lbm/bbl, from 8 lbm/bbl to 25 lbm/bbl, from 8 lbm/bbl to 20 lbm/bbl, from 8 lbm/bbl to 15 lbm/bbl, from 15 lbm/bbl to 25 lbm/bbl, from 15 lbm/bbl to 20 lbm/bbl, or from 20 lbm/bbl to 25 lbm/bbl ethoxylated alcohol compound.

The invert emulsion fluid may have an amount of the polyaminated fatty acid compound sufficient in the presence of the ethoxylated alcohol compound to create the synergistic effect to provide increased emulsion stability to the invert emulsion fluid compared invert emulsion fluid lacking the ethoxylated alcohol compound. In embodiments, the invert emulsion fluid may have from 0.25 lbm/bbl (0.71 kg/m$^3$) to 25 lbm/bbl (71 kg/m$^3$) polyaminated fatty acid compound. The invert emulsion fluid may include from 0.25 lbm/bbl to 20 lbm/bbl, from 0.25 lbm/bbl to 15 lbm/bbl, from 0.25 lbm/bbl to 8 lbm/bbl, from 0.25 lbm/bbl to 5 lbm/bbl, from 0.25 lbm/bbl to 1 lbm/bbl, from 0.25 lbm/bbl to 0.5 lbm/bbl, from 0.5 lbm/bbl to 25 lbm/bbl, from 0.5 lbm/bbl to 20 lbm/bbl, from 0.5 lbm/bbl to 15 lbm/bbl, from 0.5 lbm/bbl to 8 lbm/bbl, from 0.5 lbm/bbl to 5 lbm/bbl, from 0.5 lbm/bbl to 1 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 8 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 8 lbm/bbl, from 8 lbm/bbl to 25 lbm/bbl, from 8 lbm/bbl to 20 lbm/bbl, from 8 lbm/bbl to 15 lbm/bbl, from 15 lbm/bbl to 25 lbm/bbl, from 15 lbm/bbl to 20 lbm/bbl, or from 20 lbm/bbl to 25 lbm/bbl polyaminated fatty acid compound. In some embodiments, the invert emulsion fluid may have from 0.25 lbm/bbl to 25 lbm/bbl ethoxylated alcohol compound and from 0.25 lbm/bbl to 25 lbm/bbl polyaminated fatty acid compound. In other embodiments, the invert emulsion fluid may have from 1 lbm/bbl to 25 lbm/bbl ethoxylated alcohol compound and from 0.25 lbm/bbl kg/m$^3$ to 10 lbm/bbl polyaminated fatty acid compound. In still other embodiments, the invert emulsion fluid may have from 5 lbm/bbl to 25 lbm/bbl ethoxylated alcohol compound and from 0.25 lbm/bbl to 5 lbm/bbl polyaminated fatty acid compound.

The invert emulsion fluid having the emulsifier composition with the ethoxylated alcohol compound and the polyaminated fatty acid compound may be used as a base fluid for a drilling fluid composition for drilling subterranean wells. To drill a subterranean well or wellbore, a drill string, including a drill bit and drill collars to weight the drill bit, is inserted into a predrilled hole and rotated to cause the drill bit to cut into the rock at the bottom of the hole, producing rock cuttings. To remove the rock cuttings from the bottom of the wellbore, the drilling fluid composition is pumped down through the drill string to the drill bit. The drilling fluid composition cools the drill bit and lifts the rock cuttings away from the drill bit. The drilling fluid composition carries the rock cuttings upwards as the drilling fluid composition is recirculated back to the surface. At the surface, the rock cuttings are removed from the drilling fluid composition, and the drilling fluid composition is then recirculated back down the drill string to the bottom of the wellbore. The term "rock cuttings" is intended to include any fragments, pieces, or particulates separated from the formation by the drill bit or otherwise present in the wellbore.

The drilling fluid compositions described in this disclosure serve several functions in the drilling process. The drilling fluid compositions provide lubrication and cooling to the drill bit. According to embodiments, the drilling fluid compositions also aid with cleaning the wellbore by transporting rock cuttings from the drill bit to the surface. The hole-cleaning ability of the drilling fluid composition refers to the ability of the drilling fluid composition to entrain rock cuttings from the drilling zone and convey the rock cuttings to the surface of the wellbore. Additionally, in embodiments, the drilling fluid compositions provide hydrostatic pressure in the wellbore to provide support to the sidewalls of the wellbore and prevent the sidewalls from collapsing and caving-in on the drill string. In embodiments, the drilling fluid compositions provide hydrostatic pressure in the wellbore to prevent fluids in the downhole formations from flowing into the wellbore during drilling operations.

The drilling fluid compositions that include the invert emulsion fluids with the ethoxylated alcohol compound and the polyaminated fatty acid compound exhibit specific properties and characteristics, including density, viscosity, solids content, pump-ability, and hole-cleaning capability, which improve handling of the drilling fluid compositions during drilling operations and preserve the ability of the drilling fluid compositions to convey the rock cuttings from the bottom of the wellbore to the surface. In particular, the drilling fluid compositions having the invert emulsion fluids with the ethoxylated alcohol compound and the polyaminated fatty acid compound exhibit specific rheological properties that enable the drilling fluid composition to be pumped down through the drill string while also enabling the drilling fluid compositions to convey the rock cuttings from drill bit to the top of the wellbore. The modified rheological properties of the drilling fluid compositions having the invert emulsion fluid with the ethoxylated alcohol compound and polyaminated fatty alcohol compound may reduce or eliminate drilling problems such as solids settling, stuck pipes, and excessive pump pressure. Additionally, the drilling fluid compositions have sufficient density to provide the hydrostatic pressure necessary to support the sidewalls of the wellbore and prevent fluids in the formation from flowing into the wellbore.

Under certain conditions, the weighting agent, such as barite for example, in a drilling fluid may separate from the liquid and settle in the wellbore. This condition is referred to as barite sag. Barite sag typically occurs when flow of a drilling fluid through the wellbore is stopped for a period of time during which the drilling fluid is static, but barite sag may also occur at decreased flow or annular velocity of the drilling fluid. Barite sag may also be worsened by reduced viscosity or reduced gel strength, reduced shear rate conditions, greater downhole temperatures and other conditions. Settling of the solid weighting material may cause variations in the density of a drilling fluid throughout the wellbore. For example, the drilling fluid in the bottom of the wellbore may be have a greater density than the same fluid near the surface, owing to settling of the solids by gravity toward the bottom of the wellbore. Barite sag conditions may lead to stuck pipe conditions, reductions in the hole-cleaning ability of the drilling fluid, or both.

Drilling fluid compositions according to embodiments include an invert emulsion fluid comprising the oleaginous phase, the aqueous phase dispersed in the oleaginous phase, and the emulsifier composition comprising the ethoxylated alcohol compound and the polyaminated alcohol compound. The drilling fluid compositions further include a weighting material to densify the drilling fluid composition. The drilling fluid composition may optionally include at least one additive that modifies or otherwise improves the properties and characteristics of the drilling fluid composition. The drilling fluid compositions that include the invert emulsion fluids provide high performance and low risk in various drilling applications. The invert emulsion fluids having the ethoxylated alcohol compound and the polyaminated fatty acid compound exhibit high thermal stability, good shale inhibition, and reusability, as compared to other water-based or oil-based drilling fluids that lack the invert emulsion fluid having the ethoxylated alcohol compound and the polyaminated fatty acid compound. The drilling fluid compositions having the invert emulsion fluids with the ethoxylated alcohol compound and the polyaminated fatty acid compound may also exhibit superior lubricity and well stability compared to drilling fluids lacking the invert emulsion fluids with the ethoxylated alcohol compound and the polyaminated fatty acid compound. The drilling fluid compositions having the invert emulsion fluids with the ethoxylated alcohol compound and the polyaminated fatty acid compound may be advantageous for drilling deep water and extended reach wells.

The drilling fluid composition may contain an amount of the invert emulsion fluid (base fluid) sufficient so that the drilling fluid composition can be circulated to the drill bit at the bottom of a wellbore and back to the surface without experiencing solids settling, stuck pipes, excessive pump pressure, or combinations of these conditions. The drilling fluid composition may include from 20 wt. % to 90 wt. % base fluid based on the total weight of the drilling fluid composition. For example, the drilling fluid composition may have from 20 wt. % to 80 wt. %, from 20 wt. % to 70 wt. %, from 20 wt. % to 60 wt. %, from 20 wt. % to 50 wt. %, from 23 wt. % to 90 wt. %, from 23 wt. % to 80 wt. %, from 23 wt. % to 70 wt. %, from 23 wt. % to 60 wt. %, from 23 wt. % to 50 wt. %, from 24 wt. % to 90 wt. %, from 24 wt. % to 80 wt. %, from 24 wt. % to 70 wt. %, from 24 wt. % to 60 wt. %, from 24 wt. % to 50 wt. %, from 25 wt. % to 90 wt. %, from 25 wt. % to 80 wt. %, from 25 wt. % to 70 wt. %, from 25 wt. % to 60 wt. %, from 25 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, or from 80 wt. % to 90 wt. % invert emulsion fluid based on the total weight of the drilling fluid composition. In some embodiments, the drilling fluid composition may have from 50 lbm/bbl to 330 lbm/bbl invert emulsion fluid. In embodiments, the drilling fluid composition may have from 50 lbm/bbl to 300 lbm/bbl, from 50 lbm/bbl to 250 lbm/bbl, from 50 lbm/bbl to 200 lbm/bbl, from 50 lbm/bbl to 150 lbm/bbl, from 100 lbm/bbl to 330 lbm/bbl, from 100 lbm/bbl to 300 lbm/bbl, from 100 lbm/bbl to 250 lbm/bbl, from 100 lbm/bbl to 200 lbm/bbl, from 150 lbm/bbl to 330 lbm/bbl, from 150 lbm/bbl to 300 lbm/bbl, from 150 lbm/bbl to 250 lbm/bbl, from 200 lbm/bbl to 330 lbm/bbl, from 200 lbm/bbl to 300 lbm/bbl, from 200 lbm/bbl to 250 lbm/bbl, or from 250 lbm/bbl to 330 lbm/bbl invert emulsion fluid.

In some embodiments, the weighting material may be a particulate solid having a specific gravity (SG) sufficient to increase the density of the drilling fluid composition by a certain amount without adding so much weighting material that the drilling fluid composition cannot be circulated through the wellbore. The weighting material may have a specific gravity (SG) of from 2 grams per cubic centimeter ($g/cm^3$) to 6 $g/cm^3$, from 2 $g/cm^3$ to 5.5 $g/cm^3$, from 2 $g/cm^3$ to 5 $g/cm^3$, from 2 $g/cm^3$ to 4.5 $g/cm^3$, from 2.5 $g/cm^3$ to 6 $g/cm^3$, from 2.5 $g/cm^3$ to 5.5 $g/cm^3$, from 2.5 $g/cm^3$ to 5 $g/cm^3$, from 2.5 $g/cm^3$ to 4.5 $g/cm^3$, from 3 $g/cm^3$ to 6 $g/cm^3$, from 3 $g/cm^3$ to 5.5 $g/cm^3$, from 3 $g/cm^3$ to 5 $g/cm^3$, or from 3 $g/cm^3$ to 4.5 $g/cm^3$. Examples of weighting materials include, but are not limited to, barite (minimum SG of 4.20 $g/cm^3$), hematite (minimum SG of 5.05 $g/cm^3$), calcium carbonate (minimum SG of 2.7-2.8 $g/cm^3$), siderite (minimum SG of 3.8 $g/cm^3$), ilmenite (minimum SG of 4.6 $g/cm^3$), other weighting materials, or any combination of these weighting materials. In some example drilling fluid compositions, the weighting material is barite.

The drilling fluid composition may include a weight percent of weighting material sufficient to increase the density of the drilling fluid composition so that the drilling fluid composition supports the wellbore and prevent fluids in downhole formations from flowing into the wellbore. In embodiments, the drilling fluid composition may include from 1 wt. % to 80 wt. % weighting material based on the total weight of the drilling fluid composition. In some embodiments, the drilling fluid composition may include from 1 wt. % to 75 wt. %, from 1 wt. % to 74 wt. %, from 1 wt. % to 73 wt. %, from 1 wt. % to 70 wt. %, from 1 wt. % to 60 wt. %, from 1 wt. % to 50 wt. %, from 20 wt. % to 80 wt. %, from 20 wt. % to 75 wt. %, from 20 wt. % to 74 wt. %, from 20 wt. % to 73 wt. %, from 20 wt. % to 70 wt. %, from 20 wt. % to 60 wt. %, from 20 wt. % to 50 wt. %, from 30 wt. % to 80 wt. %, from 30 wt. % to 75 wt. %, from 30 wt. % to 74 wt. %, from 30 wt. % to 73 wt. %, from 30 wt. % to 70 wt. %, from 30 wt. % to 60 wt. %, from 30 wt. % to 50 wt. %, from 50 wt. % to 80 wt. %, from 50 wt. % to 75 wt. %, from 50 wt. % to 74 wt. %, from 50 wt. % to 73 wt. %, from 50 wt. % to 70 wt. %, from 50 wt. % to 60 wt. %, from 60 wt. % to 80 wt. %, or from 60 wt. % to 75 wt. % weighting material based on the total weight of the drilling fluid composition. In embodiments, the drilling fluid composition may include from 4 lbm/bbl to 700 lbm/bbl weighting material. In some embodiments, the drilling fluid composition may include from 4 lbm/bbl to 500 lbm/bbl, from 4 lbm/bbl to 300 lbm/bbl, from 4 lbm/bbl to 100 lbm/bbl, from 4 lbm/bbl to 50 lbm/bbl, from 50 lbm/bbl to 700 lbm/bbl, from 50 lbm/bbl to 500 lbm/bbl, from 50 lbm/bbl to 300 lbm/bbl, from 50 lbm/bbl to 100 lbm/bbl, from 100 lbm/bbl to 700 lbm/bbl, from 100 lbm/bbl to 500 lbm/bbl, from 100 lbm/bbl to 300 lbm/bbl, from 300 lbm/bbl to 700 lbm/bbl, from 300 lbm/bbl to 500 lbm/bbl, or from 500 lbm/bbl to 700 lbm/bbl weighting material.

The drilling fluid composition has an amount of the ethoxylated alcohol compound that, in the presence of the polyaminated fatty acid compound, is sufficient to stabilize the invert emulsion fluid of the drilling fluid composition. In some embodiments, the drilling fluid composition has an amount of the ethoxylated alcohol compound that, in the presence of the polyaminated fatty acid compound, is sufficient to reduce or eliminate barite sag of the drilling fluid composition compared to a drilling fluid lacking the ethoxylated alcohol compound. In embodiments, the drilling fluid composition may have from 0.25 lbm/bbl (0.71 kg/m$^3$) to 25 lbm/bbl (71 kg/m$^3$) ethoxylated alcohol compound. The drilling fluid composition may include from 0.25 lbm/bbl to 20 lbm/bbl, from 0.25 lbm/bbl to 15 lbm/bbl, from 0.25 lbm/bbl to 8 lbm/bbl, from 0.25 lbm/bbl to 5 lbm/bbl, from 0.25 lbm/bbl to 1 lbm/bbl, from 0.25 lbm/bbl to 0.5 lbm/bbl, from 0.5 lbm/bbl to 25 lbm/bbl, from 0.5 lbm/bbl to 20 lbm/bbl, from 0.5 lbm/bbl to 15 lbm/bbl, from 0.5 lbm/bbl to 8 lbm/bbl, from 0.5 lbm/bbl to 5 lbm/bbl, from 0.5 lbm/bbl to 1 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 8 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 8 lbm/bbl, from 8 lbm/bbl to 25 lbm/bbl, from 8 lbm/bbl to 20 lbm/bbl, from 8 lbm/bbl to 15 lbm/bbl, from 15 lbm/bbl to 25 lbm/bbl, from 15 lbm/bbl to 20 lbm/bbl, or from 20 lbm/bbl to 25 lbm/bbl ethoxylated alcohol compound. Alternatively, in embodiments, the drilling fluid composition may have from 0.05 wt. % to 5 wt. % of the ethoxylated alcohol compound based on the total weight of the drilling fluid composition. In some embodiments, the drilling fluid composition may have from 0.05 wt. % to 3 wt. %, from 0.05 wt. % to 1 wt. %, from 0.05 wt. % to 0.5 wt. %, from 0.05 wt. % to 0.1 wt. %, from 0.1 wt. % to 5 wt. %, from 0.1 wt. % to 3 wt. %, from 0.1 wt. % to 1 wt. %, from 0.1 wt. % to 0.5 wt. %, from 0.5 wt. % to 5 wt. %, from 0.5 wt. % to 3 wt. %, from 0.5 wt. % to 1 wt. %, from 1 wt. % to 5 wt. %, from 1 wt. % to 3 wt. %, or from 3 wt. % to 5 wt. % ethoxylated alcohol compound, based on the total weight of the drilling fluid composition.

The drilling fluid composition has an amount of the polyaminated fatty acid compound that, in the presence of the ethoxylated alcohol compound, is sufficient to stabilize the invert emulsion fluid of the drilling fluid composition. In some embodiments, the drilling fluid composition has an amount of the polyaminated fatty acid compound that, in the presence of the ethoxylated alcohol compound, is sufficient to reduce or eliminate barite sag of the drilling fluid composition compared to a drilling fluid lacking the polyaminated fatty acid compound. In embodiments, the drilling fluid composition may include from 0.25 lbm/bbl (0.71 kg/m$^3$) to 25 lbm/bbl (71 kg/m$^3$) polyaminated fatty acid compound. The invert emulsion fluid may include from 0.25 lbm/bbl to 20 lbm/bbl, from 0.25 lbm/bbl to 15 lbm/bbl, from 0.25 lbm/bbl to 8 lbm/bbl, from 0.25 lbm/bbl to 5 lbm/bbl, from 0.25 lbm/bbl to 1 lbm/bbl, from 0.25 lbm/bbl to 0.5 lbm/bbl, from 0.5 lbm/bbl to 25 lbm/bbl, from 0.5 lbm/bbl to 20 lbm/bbl, from 0.5 lbm/bbl to 15 lbm/bbl, from 0.5 lbm/bbl to 8 lbm/bbl, from 0.5 lbm/bbl to 5 lbm/bbl, from 0.5 lbm/bbl to 1 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 8 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 8 lbm/bbl, from 8 lbm/bbl to 25 lbm/bbl, from 8 lbm/bbl to 20 lbm/bbl, from 8 lbm/bbl to 15 lbm/bbl, from 15 lbm/bbl to 25 lbm/bbl, from 15 lbm/bbl to 20 lbm/bbl, or from 20 lbm/bbl to 25 lbm/bbl polyaminated fatty acid compound. Alternatively, in embodiments, the drilling fluid composition may have from 0.05 wt. % to 5 wt. % polyaminated fatty acid compound based on the total weight of the drilling fluid composition. In some embodiments, the drilling fluid composition may have from 0.05 wt. % to 3 wt. %, from 0.05 wt. % to 1 wt. %, from 0.05 wt. % to 0.5 wt. %, from 0.05 wt. % to 0.1 wt. %, from 0.1 wt. % to 5 wt. %, from 0.1 wt. % to 3 wt. %, from 0.1 wt. % to 1 wt. %, from 0.1 wt. % to 0.5 wt. %, from 0.5 wt. % to 5 wt. %, from 0.5 wt. % to 3 wt. %, from 0.5 wt. % to 1 wt. %, from 1 wt. % to 5 wt. %, from 1 wt. % to 3 wt. %, or from 3 wt. % to 5 wt. % polyaminated fatty acid compound, based on the total weight of the drilling fluid composition.

The drilling fluid composition may include a salt. Without intent to be bound by any particular theory, a salt may be incorporated into the drilling fluid composition to maintain the osmotic balance between the drilling fluid composition and the formation. In some embodiments, salts that may be present in the aqueous phase may include metal salts such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides or combinations of these, for example.

In some embodiments, the drilling fluid composition includes calcium chloride (CaCl$_2$). In embodiments, the drilling fluid composition includes an amount of CaCl$_2$ sufficient to achieve an aqueous phase salinity of from 10 wt. % to 40 wt. % based on the total weight of the aqueous phase of the invert emulsion fluid. As used in this disclosure, the aqueous phase salinity refers to the weight fraction of salt in the aqueous phase of the invert emulsion fluid that is included in the drilling fluid composition. In some embodiments, the drilling fluid composition may include an amount of CaCl$_2$ sufficient to achieve an aqueous phase salinity of from 10 wt. % to 35 wt. %, 10 wt. % to 30 wt. %, 10 wt. % to 25 wt. %, from 10 wt. % to 20 wt. %, from 10 wt. % to 15 wt. %, from 15 wt. % to 40 wt. %, from 15 wt. % to 35 wt. %, from 15 wt. % to 30 wt. %, from 15 wt. % to 25 wt. %, from 15 wt. % to 20 wt. %, from 20 wt. % to 40 wt. %, from 20 wt. % to 35 wt. %, from 20 wt. % to 30 wt. %, from 20 wt. % to 25 wt. %, from 25 wt. % to 40 wt. %, from 25 wt. % to 35 wt. %, from 25 wt. % to 30 wt. %, from 30 wt. % to 40 wt. %, or from 30 wt. % to 35 wt. % based on the weight of the aqueous phase of the invert emulsion fluid.

In some embodiments, the drilling fluid composition may include from 0.5 lbm/bbl to 120 lbm/bbl CaCl$_2$. In embodiments, the drilling fluid composition may include from 0.5 lbm/bbl to 90 lbm/bbl, from 0.5 lbm/bbl to 60 lbm/bbl, from 0.5 lbm/bbl to 30 lbm/bbl, from 0.5 lbm/bbl to 10 lbm/bbl, from 0.5 lbm/bbl to 5 lbm/bbl, from 0.5 lbm/bbl to 1 lbm/bbl, from 1 lbm/bbl to 120 lbm/bbl, from 1 lbm/bbl to 90 lbm/bbl, from 1 lbm/bbl to 60 lbm/bbl, from 1 lbm/bbl to 30 lbm/bbl, from 1 lbm/bbl to 10 lbm/bbl, from 1 lbm/bbl to 5 lbm/bbl, from 5 lbm/bbl to 120 lbm/bbl, from 5 lbm/bbl to 90 lbm/bbl, from 5 lbm/bbl to 60 lbm/bbl, from 5 lbm/bbl to 30 lbm/bbl, from 5 lbm/bbl to 10 lbm/bbl, from 10 lbm/bbl to 120 lbm/bbl, from 10 lbm/bbl to 90 lbm/bbl, from 10 lbm/bbl to 60 lbm/bbl, from 10 lbm/bbl to 30 lbm/bbl, from 30 lbm/bbl to 120 lbm/bbl, from 30 lbm/bbl to 90 lbm/bbl, from 30 lbm/bbl to 60 lbm/bbl, from 60 lbm/bbl to 120 lbm/bbl, from 60 lbm/bbl to 90 lbm/bbl, or from 90 lbm/bbl to 120 lbm/bbl CaCl$_2$. Alternatively, in some embodiments, the drilling fluid composition may have from 0.1 wt. % to 10 wt. % CaCl$_2$ based on the total weight of the drilling fluid composition. In other embodiments, the drilling fluid composition may have from 0.1 wt. % to 8 wt. %, from 0.1 wt. % to 6 wt. %, from 0.1 wt. % to 4 wt. %, from 0.1 wt. % to 2 wt. %, from 1 wt. % to 10 wt. %, from 1 wt. % to 8 wt. %, from 1 wt. % to 6 wt. %, from 1 wt. % to 4 wt. %, from 1 wt. % to 2 wt. %, from 2 wt. % to 10 wt. %, from 2 wt. % to 8 wt. %, from 2 wt. % to 6 wt. %, from 2 wt. % to 4 wt. %, from 4 wt. % to 10 wt. %, from 4 wt. % to 8 wt. %, from 4 wt. % to 6 wt. %, from 6 wt. % to 10 wt. %, from 6 wt. % to 8 wt. %, or from 8 wt. % to 10 wt. % $CaCl_2$ based on the total weight of the drilling fluid composition.

The drilling fluid compositions may optionally include one or a plurality of additives to adjust the properties and characteristics of the drilling fluid composition. Examples of the additives include, but are not limited to, supplemental emulsifiers, fluid-loss control additives, viscosifiers (viscosity control agents), alkali compounds, filtration control agents, or combinations of these. The drilling fluid composition may also optionally include emulsifier activators, pH buffers, electrolytes, glycols, glycerols, dispersion aids, corrosion inhibitors, defoamers, and other additives or combinations of additives.

Viscosifiers may include, but are not limited to, organoclays such as organobentonite for example, certain fatty acids, other viscosifiers or combinations of these viscosifiers. In embodiments, the drilling fluid composition may optionally include an amount of at least one viscosifier sufficient to impart non-Newtonian fluid rheology to the drilling fluid composition to facilitate lifting and conveying rock cuttings to the surface of the wellbore. In some embodiments, the drilling fluid composition may include from 0.5 lbm/bbl to 25 lbm/bbl, from 0.5 lbm/bbl to 20 lbm/bbl, from 0.5 lbm/bbl to 15 lbm/bbl, from 0.5 lbm/bbl to 10 lbm/bbl, from 0.5 lbm/bbl to 5 lbm/bbl, from 0.5 lbm/bbl to 1 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 10 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 10 lbm/bbl, from 10 lbm/bbl to 25 lbm/bbl, from 10 lbm/bbl to 20 lbm/bbl, from 10 lbm/bbl to 15 lbm/bbl, from 15 lbm/bbl to 25 lbm/bbl, from 15 lbm/bbl to 20 lbm/bbl, or from 20 lbm/bbl to 25 lbm/bbl viscosifier. In some embodiments, the viscosifier may include an organoclay such as bentonite. In some embodiments, the drilling fluid composition may optionally include from 0.5 lbm/bbl to 25 lbm/bbl organoclay, based on the total weight of the drilling fluid composition. In other embodiments, the drilling fluid composition may optionally include from 0.5 lbm/bbl to 20 lbm/bbl, from 0.5 lbm/bbl to 15 lbm/bbl, from 0.5 lbm/bbl to 10 lbm/bbl, from 0.5 lbm/bbl to 5 lbm/bbl, from 0.5 lbm/bbl to 1 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 10 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 10 lbm/bbl, from 10 lbm/bbl to 25 lbm/bbl, from 10 lbm/bbl to 20 lbm/bbl, from 10 lbm/bbl to 15 lbm/bbl, from 15 lbm/bbl to 25 lbm/bbl, from 15 lbm/bbl to 20 lbm/bbl, or from 20 lbm/bbl to 25 lbm/bbl bentonite. The drilling fluid composition may optionally include other suitable viscosifiers without deviating from the scope of the present subject matter.

In some embodiments, the drilling fluid composition may optionally include an amount of a filtration control agent sufficient to provide for efficient filtration of the drilling fluid composition to remove rock cuttings from the drilling fluid composition. In some embodiments, the drilling fluid composition may optionally include from 0.5 lbm/bbl to 10 lbm/bbl, from 0.5 lbm/bbl to 7 lbm/bbl, from 0.5 lbm/bbl to 4 lbm/bbl, from 0.5 lbm/bbl to 2 lbm/bbl, from 0.5 lbm/bbl to 1 lbm/bbl, from 1 lbm/bbl to 10 lbm/bbl, from 1 lbm/bbl to 7 lbm/bbl, from 1 lbm/bbl to 4 lbm/bbl, from 1 lbm/bbl to 2 lbm/bbl, from 2 lbm/bbl to 10 lbm/bbl, from 2 lbm/bbl to 7 lbm/bbl, from 2 lbm/bbl to 4 lbm/bbl, from 4 lbm/bbl to 10 lbm/bbl, from 4 lbm/bbl to 7 lbm/bbl, or from 7 lbm/bbl to 10 lbm/bbl filtration control agent.

In some embodiments, the drilling fluid composition may include at least one alkali compound. Examples of alkali compounds may include, but are not limited to, lime (calcium hydroxide or calcium oxide), sodium hydroxide, potassium hydroxide, other strong base, or combinations of these alkali compounds. The alkali compound, such as lime for example, may be added to the drilling fluid composition to activate the polyaminated fatty acid compound of the emulsifier composition. For example, in embodiments, lime or other alkali compound may activate the polyamintated fatty acid compound by reacting with the polyaminated fatty acid to form the calcium salt of the polyaminated fatty acid compound. Additional amounts of alkali compounds may be added if $CO_2$ or $H_2S$ are present in the downhole formation or in the drilling fluid composition. Without intent to be bound by any particular theory, the alkali compounds may prevent hydrolysis of components of the drilling fluid composition by reacting with gases commonly encountered by the drilling fluid composition during drilling operations, such as $CO_2$ or $H_2S$ for example. Example drilling fluid compositions may include from 0.5 lbm/bbl to 10 lbm/bbl lime. In other embodiments, the drilling fluid composition may include from 0.5 lbm/bbl to 7 lbm/bbl, from 0.5 lbm/bbl to 4 lbm/bbl, from 0.5 lbm/bbl to 2 lbm/bbl, from 0.5 lbm/bbl to 1 lbm/bbl, from 1 lbm/bbl to 10 lbm/bbl, from 1 lbm/bbl to 7 lbm/bbl, from 1 lbm/bbl to 4 lbm/bbl, from 1 lbm/bbl to 2 lbm/bbl, from 2 lbm/bbl to 10 lbm/bbl, from 2 lbm/bbl to 7 lbm/bbl, from 2 lbm/bbl to 4 lbm/bbl, from 4 lbm/bbl to 10 lbm/bbl, from 4 lbm/bbl to 7 lbm/bbl, or from 7 lbm/bbl to 10 lbm/bbl lime.

The drilling fluid composition may have a density of from 65 pounds of mass per cubic foot ($lbm/ft^3$) to 160 $lbm/ft^3$, from 65 $lbm/ft^3$ to 140 $lbm/ft^3$, from 65 $lbm/ft^3$ to 120 $lbm/ft^3$, from 65 $lbm/ft^3$ to 100 $lbm/ft^3$, from 90 $lbm/ft^3$ to 160 $lbm/ft^3$, from 90 $lbm/ft^3$ to 140 $lbm/ft^3$, from 90 $lbm/ft^3$ to 120 $lbm/ft^3$, from 90 $lbm/ft^3$ to 100 $lbm/ft^3$, from 100 $lbm/ft^3$ to 140 $lbm/ft^3$, from 100 $lbm/ft^3$ to 120 $lbm/ft^3$, or from 120 $lbm/ft^3$ to 160 $lbm/ft^3$, where 1 $lbm/ft^3$ is approximately 16.02 kilograms per cubic meter ($kg/m^3$). Some example drilling fluid compositions may have a density that is equal to or greater than 65 $lbm/ft^3$ (1,041 $kg/m^3$). Other example drilling fluid compositions may have a density that is equal to or greater than 90 $lbm/ft^3$ (1,442 $kg/m^3$). Still other example drilling fluid compositions may have a density of from 65 $lbm/ft^3$ (1,041 $kg/m^3$) to 160 $lbm/ft^3$ (2,563 $kg/m^3$).

The emulsion stability of the invert emulsion drilling fluids having the emulsifier system may be evaluated by high temperature/high pressure (HTHP) fluid loss tests on the invert emulsion drilling fluids. The HTPT fluid loss characteristics of the invert emulsion drilling fluids may be determined using a 175 milliliter (mL) capacity HTHP filter press cell according to API 13B 2 Recommended Practice for Field Test of Oil-based Drilling Fluids. The HTPT fluid loss characteristics may be determined at a temperature of 250° F. Presence of water in the HTPT filtrate signifies that the water-in-oil emulsion of the invert emulsion drilling fluid is unstable. The fluid loss characteristics include a total HTHP fluid loss, which is reported in milliliters (mL), and water layer of the HTPT filtrate, which is the volume of water in a water layer of the filtrate and is reported in milliliters (mL).

The rheological behavior of the drilling fluid compositions having the invert emulsion fluid and emulsifier composition may have rheological properties, such as gel strength, plastic viscosity, and yield point, that may be determined from measurements of the viscosity, shear stress, and shear rate of the drilling fluid composition. The viscosity, shear stress, and shear rate of the drilling fluid compositions may be measured using a standard oilfield viscometer, such as a FANN® Model 35 viscometer manufactured by Fann Instrument Company for example, according to test methods provided in the API Recommended Practice For Field Testing Water-Based Drilling Fluids (RP 13B-1/ISO 10414-1:2002). The viscosity is reported in units of centipoise (cP), the shear stress is provided in units of pounds of force per 100 square feet (lbf/100 ft$^2$), and the shear rate is provided in units of per second (s$^{-1}$).

The gel strength refers to the shear stress of the drilling fluid composition measured at a low shear rate following a defined period of time during which the drilling fluid composition is maintained in a static state. The shear stress of the drilling fluid composition at low shear rate may be measured using the previously described rheometer operated at low rpms, such as at 3 rpm or 6 rpm. To measure the gel strength, the drilling fluid composition is first stirred by contacting the drilling fluid composition with the spindle of the viscometer and operating the viscometer at 600 rotations per minute (rpm). The viscometer is then turned off for period of time (time period). For a 10-second gel strength, the time period is 10 seconds, and for a 10-minute gel strength, the time period is 10 minutes. Other time periods for measuring gel strength of the drilling fluid composition are contemplated. During the time period, the drilling fluid composition comes to rest in a static state. Upon expiration of the time period, the viscometer is turned back on at a low speed, such as 3 rpm, to generate a low shear rate in the drilling fluid composition. The viscometer reading is then taken. The gel strength of the drilling fluid composition is reported in units of pounds of force per 100 feet squared (lbf/100 ft$^2$).

The drilling fluid compositions of the present disclosure, which include the invert emulsion fluids having the emulsifier composition comprising the ethoxylated alcohol compound and the polyaminated fatty acid compound, may have a 10-second gel strength of less than or equal to 30 lbf/100 ft$^2$, less than or equal to 25 lbf/100 ft$^2$, or less than or equal to 20 lbf/100 ft$^2$. In some embodiments, the drilling fluid compositions may have a 10-second gel strength of from 1 lbf/100 ft$^2$ to 30 lbf/100 ft$^2$, from 1 lbf/100 ft$^2$ to 25 lbf/100 ft$^2$, from 1 lbf/100 ft$^2$ to 20 lbf/100 ft$^2$, from 1 lbf/100 ft$^2$ to 15 lbf/100 ft$^2$, from 5 lbf/100 ft$^2$ to 30 lbf/100 ft$^2$, from 5 lbf/100 ft$^2$ to 25 lbf/100 ft$^2$, from 5 lbf/100 ft$^2$ to 20 lbf/100 ft$^2$, from 5 lbf/100 ft$^2$ to 15 lbf/100 ft$^2$, from 10 lbf/100 ft$^2$ to 30 lbf/100 ft$^2$, from 10 lbf/100 ft$^2$ to 25 lbf/100 ft$^2$, from 10 lbf/100 ft$^2$ to 20 lbf/100 ft$^2$, from 10 lbf/100 ft$^2$ to 15 lbf/100 ft$^2$, or from 1 lbf/100 ft$^2$ to 10 lbf/100 ft$^2$. In one or more embodiments, the drilling fluid compositions that include the invert emulsion fluids having the ethoxylated alcohol compound and the polyaminated fatty acid compound may have a 10-second gel strength of from 5 lbf/100 ft$^2$ to 25 lbf/100 ft$^2$. Alternatively, in other embodiments, the drilling fluid compositions that include the invert emulsion fluids having the ethoxylated alcohol compound and the polyaminated fatty acid compound may have a 10-second gel strength of from 5 lbf/100 ft$^2$ to 20 lbf/100 ft$^2$.

The drilling fluid compositions that include the invert emulsion fluids having the ethoxylated alcohol compound and the polyaminated fatty acid compound may have a 10-minute gel strength of less than or equal to 50 lbf/100 ft$^2$, less than or equal to 45 lbf/100 ft$^2$, or less than or equal to 40 lbf/100 ft$^2$. In some embodiments, the drilling fluid composition that includes the invert emulsion fluids having the ethoxylated alcohol compound and the polyaminated fatty acid compound may have a 10-minute gel strength of from 5 lbf/100 ft$^2$ to 50 lbf/100 ft$^2$, from 5 lbf/100 ft$^2$ to 45 lbf/100 ft$^2$, from 5 lbf/100 ft$^2$ to 40 lbf/100 ft$^2$, from 5 lbf/100 ft$^2$ to 35 lbf/100 ft$^2$, from 10 lbf/100 ft$^2$ to 50 lbf/100 ft$^2$, from 10 lbf/100 ft$^2$ to 45 lbf/100 ft$^2$, from 10 lbf/100 ft$^2$ to 40 lbf/100 ft$^2$, from 10 lbf/100 ft$^2$ to 35 lbf/100 ft$^2$, from 15 lbf/100 ft$^2$ to 50 lbf/100 ft$^2$, from 15 lbf/100 ft$^2$ to 45 lbf/100 ft$^2$, from 15 lbf/100 ft$^2$ to 40 lbf/100 ft$^2$, from 15 lbf/100 ft$^2$ to 35 lbf/100 ft$^2$, or from 20 lbf/100 ft$^2$ to 50 lbf/100 ft$^2$. In one or more embodiments, the drilling fluid compositions that include the invert emulsion fluids having the ethoxylated alcohol compound and the polyaminated fatty acid compound may have a 10-minute gel strength of from 10 lbf/100 ft$^2$ to 45 lbf/100 ft$^2$. Alternatively, in other embodiments, the drilling fluid composition that include the invert emulsion fluids having the ethoxylated alcohol compound and the polyaminated fatty acid compound may have a 10-minute gel strength of from 20 lbf/100 ft$^2$ to 50 lbf/100 ft$^2$.

The rheology of the drilling fluid compositions may be modeled based on Bingham plastic flow behavior. In particular, drilling fluid compositions behave as rigid bodies at low stress but flow as viscous fluids at higher shear stress. The rheological behavior of the drilling fluid compositions may be determined by measuring the shear stress on the drilling fluid compositions at different shear rates, which may be accomplished by measuring the shear stress and/or shear rate on the drilling fluid compositions using the previously described rheometer operated at 3 rpm, 6 rpm, 100 rpm, 200 rpm, 300 rpm, and 600 rpm. The rheology of the drilling fluid compositions may be characterized by the plastic viscosity (PV) and the yield point (YP), which are parameters from the Bingham plastic rheology model. The PV is related to the resistance of the drilling fluid composition to flow due to mechanical interaction between the weighting material and other solid components of the drilling fluid composition and represents the viscosity of the drilling fluid composition extrapolated to infinite shear rate. The PV reflects the type and amount of the weighting material and other solid components in the drilling fluid composition, and a lesser PV is preferred. The PV of a drilling fluid composition may be estimated by measuring the shear stress of the drilling fluid composition using the previously described rheometer at spindle speeds of 300 rotations per minute (rpm) and 600 rpm and subtracting the 300 rpm viscosity measurement from the 600 rpm viscosity measurement according to Equation 2, which is subsequently provided. The PV is provided in this disclosure in units of centipoise (cP).

$$PV = (\text{viscosity at 600 rpm}) - (\text{viscosity at 300 rpm}) \quad \text{EQU. 2}$$

The YP represents the shear stress below which the drilling fluid composition behaves as a rigid body and above which the drilling fluid composition flows as a viscous fluid. In other words, the YP represents the amount of stress required to move the drilling fluid composition from a static condition. The YP is determined by extrapolating the Bingham plastic rheology model to a shear rate of zero. The YP of the drilling fluid composition may be estimated from the PV from Equation 2 by subtracting the PV from Equation 2 from the shear stress of the drilling fluid composition measured at 300 rpm according to Equation 3 provided subsequently.

$$YP = (300 \text{ rpm reading}) - PV \qquad \text{EQU. 3}$$

The YP is expressed as a force per area, such as pounds of force per one hundred square feet (lbf/100 ft²) for example. YP provides an indication of the rock cuttings carrying capacity of the drilling fluid composition through the annulus, which in simplified terms gives an indication of the drilling fluid composition's hole-cleaning ability. A drilling fluid composition having a YP of equal to or greater than 15 lbf/100 ft² is considered acceptable for drilling.

The drilling fluid compositions that include the invert emulsion fluids having the ethoxylated alcohol compound and the polyaminated fatty acid compound, as described previously in this disclosure, may have a PV of from 5 cP to 80 cP, from 5 cP to 60 cP, from 5 cP to 40 cP, from 5 cP to 20 cP, from 5 cP to 10 cP, from 10 cP to 80 cP, from 10 cP to 60 cP, from 10 cP to 40 cP, from 10 cP to 20 cP, from 20 cP to 80 cP, from 20 cP to 60 cP, from 20 cP to 40 cP, from 40 cP to 80 cP, from 40 cP to 60 cP or from 60 cP to 80 cP. In some embodiments, the drilling fluid compositions that include the invert emulsion fluids having the ethoxylated alcohol compound and the polyaminated fatty acid compound may have a PV of from 5 cP to 80 cP. In some embodiments, the drilling fluid compositions that include the invert emulsion fluids having the ethoxylated alcohol compound and the polyaminated fatty acid compound may have a PV of from 25 cP to 60 cP. Alternatively, in some embodiments, the drilling fluid compositions that include the invert emulsion fluids having the ethoxylated alcohol compound and the polyaminated fatty acid compound may have a PV of from 30 cP to 55 cP.

The drilling fluid compositions that include the invert emulsion fluids having the ethoxylated alcohol compound and the polyaminated fatty acid compound, as described previously in this disclosure, may have a YP of from 5 lbf/100 ft² to 100 lbf/100 ft², from 5 lbf/100 ft² to 80 lbf/100 ft², from 5 lbf/100 ft² to 60 lbf/100 ft², from 10 lbf/100 ft² to 100 lbf/100 ft², from 10 lbf/100 ft² to 80 lbf/100 ft², from 10 lbf/100 ft² to 60 lbf/100 ft², from 20 lbf/100 ft² to 100 lbf/100 ft², from 20 lbf/100 ft² to 80 lbf/100 ft², from 20 lbf/100 ft² to 60 lbf/100 ft², from 30 lbf/100 ft² to 100 lbf/100 ft², from 30 lbf/100 ft² to 80 lbf/100 ft², from 30 lbf/100 ft² to 60 lbf/100 ft², from 35 lbf/100 ft² to 100 lbf/100 ft², from 35 lbf/100 ft² to 80 lbf/100 ft², or from 35 lbf/100 ft² to 60 lbf/100 ft². In one or more embodiments, the drilling fluid compositions that include the invert emulsion fluids having the ethoxylated alcohol compound and the polyaminated fatty acid compound may have a YP of from 20 lbf/100 ft² to 80 lbf/100 ft². Alternatively, in some embodiments, the drilling fluid compositions that include the invert emulsion fluids having the ethoxylated alcohol compound and the polyaminated fatty acid compound may have a YP of from 30 lbf/100 ft² to 70 lbf/100 ft².

The yield stress ($\tau_0$) is a parameter from the Herschel Buckley (HB) rheology model that can be used to indicate the susceptibility of the drilling fluid compositions to barite sag. The parameter $\tau_0$ is proportional to the barite sag resistance of the drilling fluid composition, such that increasing $\tau_0$ indicates increasing barite sag resistance of the drilling fluid composition. The $\tau_0$ of the drilling fluid composition is determined by fitting the HB model to the shear stress versus shear rate curve obtained by measuring the shear stress and/or shear rate on the drilling fluid composition using the previously described rheometer operated at 3 rpm, 6 rpm, 100 rpm, 200 rpm, 300 rpm, and 600 rpm. The shear stress versus the shear rate curve is obtained by plotting the dial readings against the corresponding speed in rpm of the viscometer at each speed. The $\tau_0$ is estimated by calculating the Low Shear Yield Point (LSYP) using Equation 4. An LSYP equal to or greater than about 7 lbm/100 ft² is considered acceptable for drilling.

$$LSYP = [2 \times (3 \text{ rpm reading})] - (6 \text{ rpm reading}) \qquad \text{EQU. 4}$$

The combination of the ethoxylated alcohol compound and the polyaminated fatty acid compound produces a synergistic effect that improves the emulsion stability of the invert emulsion fluid compared to invert emulsion fluids having only the ethoxylated alcohol compound, only the polyaminated fatty acid compound, or neither of the ethoxylated alcohol compound or polyaminated fatty acid compound. When present in the drilling fluid composition having the invert emulsion fluid, the combination of the ethoxylated alcohol compound and the polyaminated fatty acid results in an increase in the hole-cleaning capacity and barite sag resistance of the drilling fluid composition.

The drilling fluid composition having the invert emulsion fluid with the ethoxylated alcohol compound and the polyaminated fatty acid compound discussed in this disclosure may be used to drill subterranean wells. A method of drilling a subterranean well includes operating a drill in a wellbore in the presence of a drilling fluid composition comprising a weighting material and an invert emulsion fluid, the invert emulsion fluid comprising an oleaginous phase, an aqueous phase dispersed in the oleaginous phase, and an emulsifier composition. The emulsifier composition includes the ethoxylated alcohol compound having formula (I):

$$R^1—(OCH_2CH_2)_n—OH \qquad \text{(I)}$$

where $R^1$ is a hydrocarbyl group having from 8 to 22 carbon atoms and n is an integer from 1 to 6, where the ethoxylated alcohol compound has a Hydrophilic-Lipophilic Balance (HLB) of less than or equal to 6. The emulsifier composition also includes the polyaminated fatty acid compound having formula (II):

$$R^2—CO—NH—CH_2—CH_2—N(COR^2)—CH_2—CH_2—NH—CO—R^3 \qquad \text{(II)}$$

where $R^2$ is hydrocarbyl group having from 1 to 20 carbon atoms and $R^3$ is a hydrocarbyl group having 1 to 10 carbon atoms or an alkylene carboxylate group having formula —$R^4$—COOH, where $R^4$ is a saturated or unsaturated hydrocarbylene having from 1 to 10 carbon atoms.

In embodiments, the drilling fluid composition comprises from 0.7 kilograms per cubic meter (kg/m3) to 72 kg/m3 of the ethoxylated alcohol compound. In embodiments, the drilling fluid composition comprises from 0.7 kg/m3 to 72 kg/m3 of the polyaminated fatty acid compound. In embodiments, the drilling fluid composition comprises a weight ratio of the ethoxylated alcohol compound to the polyaminated fatty acid compound of from 70:30 to 99:1, or from 70:30 to 95:5, or from 80:20 to 95:5. In embodiments, the drilling fluid composition comprises calcium chloride. The drilling fluid composition comprises a water phase salinity of from 10 wt. % to 40 wt. % based on the weight of the aqueous phase of the invert emulsion fluid. In embodiments, the drilling fluid composition further comprises at least one additive chosen from an organoclay, a rheology modifier, a filtration control agent, an alkali compound, or combinations of these. In other embodiments, the drilling fluid composition may be any other drilling fluid composition according to an embodiment previously described in this disclosure.

In embodiments of the method of drilling a subterranean well, the emulsifier composition comprising the ethoxylated alcohol compound and the polyaminated fatty acid compound provides increased emulsion stability to the drilling fluid composition to resist settling of the weighting material. In embodiments of the method, the combination of the ethoxylated alcohol compound and the polyaminated fatty acid compound provides a synergistic effect that reduces fluid loss from the drilling fluid composition. In other embodiments, the method further comprises maintaining the hole-cleaning capabilities of the drilling fluid composition through improved emulsion stability provided by the combination of the ethoxylated alcohol compound and the polyaminated fatty acid compound. In other embodiments, the method further comprises preventing fluid loss from the drilling fluid composition through the synergistic effect provided by the combination of the ethoxylated alcohol compound and the polyaminated fatty acid compound. In embodiments, the method further comprises adding the ethoxylated alcohol compound, polyaminated fatty acid compound, or both the ethoxylated alcohol compound and the polyaminated fatty acid compound to the drilling fluid composition to provide increased emulsion stability to the drilling fluid composition compared to drilling fluids lacking the ethoxylated alcohol compound and the polyaminated fatty acid compound.

A method for increasing the emulsion stability of a drilling fluid composition includes introducing an emulsifier composition to the drilling fluid composition comprising a weighting material and an invert emulsion fluid, the invert emulsion fluid comprising an oleaginous phase and an aqueous phase dispersed in the oleaginous phase. The emulsifier composition comprises the ethoxylated alcohol compound having formula (I):

$$R^1-(OCH_2CH_2)_n-OH \quad (I)$$

where $R^1$ is a hydrocarbyl group having from 8 to 22 carbon atoms and n is an integer from 1 to 6. The ethoxylated alcohol compound has a Hydrophilic-Lipophilic Balance (HLB) of less than or equal to 6. The emulsifier composition also includes the polyaminated fatty acid compound having formula (II):

$$R^2-CO-NH-CH_2-CH_2-N(COR^2)-CH_2-CH_2-NH-CO-R^3 \quad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms. In embodiments, the method of increasing the emulsion stability of the drilling fluid composition further includes operating a drill in a wellbore in the presence of the drilling fluid composition. In some embodiments, the emulsifier composition may be introduced to the drilling fluid composition while operating the drill in the wellbore in the presence of the drilling fluid composition. In some embodiments, the method of increasing the emulsion stability of the drilling fluid composition may include adding the ethoxylated alcohol compound or the polyaminated fatty acid compound to the drilling fluid that includes the ethoxylated alcohol compound, the polyaminated fatty acid compound, or both the ethoxylated alcohol compound and the polyaminated fatty acid compound. In embodiments, the ethoxylated alcohol compound, the polyaminated fatty acid compound, or both the ethoxylated alcohol compound and the polyaminated fatty acid compound may be added to the drilling fluid composition during operation of the drill in the wellbore. In other embodiments, the drilling fluid composition may be any other drilling fluid composition according to an embodiment previously described in this disclosure. The combination of the ethoxylated alcohol compound and the polyaminated alcohol compound results in a synergistic effect that increases the emulsion stability of the drilling fluid composition.

EXAMPLES

The following examples illustrate one or more additional features of the present disclosure described previously. It should be understood that these examples are not intended to limit the scope of this disclosure or the scope of the appended claims. For the Examples, drilling fluid compositions having the invert emulsion fluid as the base fluid were formulated to have a volume ratio of water to oil of 30:70 and a density of 90 pounds per cubic foot (pcf). For each of the examples, the formulation of the drilling fluid composition was adjusted to maintain the density of the drilling fluid composition constant at 90 pcf. The formulations included safra oil as the oleaginous phase and barite as the weighting agent. The ethoxylated alcohol compound was a $C_{12}$-$C_{14}$ fatty alcohol ethoxylate having formula (I) in which n was 1 and $R^1$ had 12 to 14 carbon atoms. The polyaminated fatty acid compound was the polyaminated fatty acid compound of formula (III). The drilling fluid compositions included $CaCl_2$. The formulations of the drilling fluid composition also include an organoclay, such as product number VG 69 organoclay obtained from Schlumberger; a rheology modifier, such as RHEMOD™ L rheology modifier obtained from Halliburton; and a filtration control agent, such as ADAPTA® brand filtration control agent obtained from Halliburton. The formulations of the drilling fluid compositions for each of Examples 1-3 are provided in Table 1. The amounts of each component in the formulation are given in weight percent based on the total weight of the drilling fluid composition.

TABLE 1

Formulations for the Drilling Fluid Compositions of Examples 1-3

| Formulation Component | Time minutes | Example 1 lbm/bbl (wt. %) | Example 2 lbm/bbl (wt. %) | Example 3 lbm/bbl (wt. %) |
|---|---|---|---|---|
| Safra Oil | | 149.9 (29.6) | 153.3 (30.3) | 147.4 (29.15) |
| $C_{12}$-$C_{14}$ Fatty Alcohol Ethoxylate | 5 | 5 (1.00) | — (—) | 7 (1.4) |
| Polyaminated Fatty Acid | 5 | — (—) | 1 (0.2) | 1 (0.2) |
| Lime | 5 | 1.5 (0.3) | 2 (0.4) | 2 (0.4) |
| Organoclay - VG 69 | 5 | 2 (0.4) | 2 (0.4) | 2 (0.4) |
| Rheology Modifier - RHEMOD L | 5 | 1.5 (0.3) | 1.5 (0.3) | 1.5 (0.3) |
| Filtration Control Agent - ADAPTA | 5 | 2 (0.4) | 2 (0.4) | 2 (0.4) |
| $CaCl_2$ | 5 | 29.4 (5.8) | 29.3 (5.8) | 29.4 (5.8) |
| Water | | 84.5 (16.7) | 84.5 (16.7) | 84.5 (16.7) |

TABLE 1-continued

Formulations for the Drilling Fluid Compositions of Examples 1-3

| Formulation Component | Time minutes | Example 1 lbm/bbl (wt. %) | Example 2 lbm/bbl (wt. %) | Example 3 lbm/bbl (wt. %) |
|---|---|---|---|---|
| Barite | 5 | 229.8 (45.5) | 229.9 (45.5) | 228.8 (45.25) |
| Total | | 505.6 (100.0) | 505.5 (100.0) | 505.6 (100.0) |

To prepare each of the drilling fluid compositions of Examples 1-3, the components of each formulation were added to a vessel and mixed for a total of 40 minutes. Table 1 provides the order and the time of mixing of each component. For example, the Safra oil was first added to the vessel (mud cup). The vessel was mounted onto a multi-mixer followed by the addition of the ethoxylated alcohol compound. The Safra oil with the ethoxylated alcohol compound was mixed for 5 min. Each of the polyaminated fatty acid compound, lime, organoclay, rheology modifier, and filtration control agent were added individually to the vessel and mixed for 5 minutes before adding each subsequent component. The water and $CaCl_2$ were first combined into a brine and then added to the vessel and mixed for 5 minutes. After the brine, the barite was added to the vessel and mixed for 5 minutes. Following combination of the components, each of the drilling fluid compositions of Examples 1-3 was dynamically aged by hot-rolling the drilling fluid composition at 250 degrees Fahrenheit (° F.) for 16 hours. Following dynamic aging, each of the drilling fluid compositions of Examples 1-3 was evaluated for 10-second gel strength, 10-minute gel strength, PV, YP, LSYP, HTHP fluid loss, and water layer in HTPT filtrate according to the methods and procedures previously described in this disclosure. The test results for the drilling fluid compositions of Examples 1-3 are provided in Table 2.

TABLE 2

Evaluation of the Performance of the Drilling Fluid Compositions of Examples 1-3

| Formulation Component | Example 1 Emulsifier Fatty Alcohol Ethoxylate | Example 2 Polyamintated Fatty Acid | Example 3 Fatty Alcohol Ethoxylate + Polyamintated Fatty Acid |
|---|---|---|---|
| Density (lbm/ft³) | 90 | 90 | 90 |
| Shear Stress at 600 rpm (lbf/100 ft²) | 95 | 85 | 105 |
| Shear Stress at 300 rpm (lbf/100 ft²) | 58 | 53 | 71 |
| Shear Stress at 200 rpm (lbf/100 ft²) | 45 | 40 | 59 |
| Shear Stress at 100 rpm (lbf/100 ft²) | 38 | 28 | 44 |
| Shear Stress at 6 rpm (lbf/100 ft²) | 7 | 14 | 19 |
| Shear Stress at 3 rpm (lbf/100 ft²) | 5 | 14 | 17 |
| 10-Second Gel Strength (lbf/100 ft²) | 8 | 20 | 17 |
| 10-Minute Gel Strength (lbf/100 ft²) | 9 | 35 | 25 |
| PV (cP) | 37 | 32 | 34 |
| YP (lbf/100 ft²) | 21 | 21 | 37 |
| LSYP (lbf/100 ft²) | 3 | 14 | 15 |

TABLE 2-continued

Evaluation of the Performance of the Drilling Fluid Compositions of Examples 1-3

| Formulation Component | Example 1 Emulsifier Fatty Alcohol Ethoxylate | Example 2 Polyamintated Fatty Acid | Example 3 Fatty Alcohol Ethoxylate + Polyamintated Fatty Acid |
|---|---|---|---|
| HTHP Fluid Loss (mL) | 23 | 15 | 2 |
| Water Layer in HTHP Filtrate (mL) | 8 | 6 | 0 |

Example 1

Drilling Fluid Composition Having the Ethoxylated Alcohol Compound

The drilling fluid composition of Example 1 included the ethoxylated alcohol compound but did not include the polyaminated fatty acid compound. The formulation for the drilling fluid composition of Example 1 was previously provided in Table 1. The ethoxylated alcohol compound in the drilling fluid composition of Example 1 was the reaction product of a naturally-derived fatty alcohol with an equal molar amount of ethylene oxide. The fatty alcohol had hydrocarbyl groups ($R^1$) from $C_{12}$ to $C_{14}$. The properties of the $C_{12}$-$C_{14}$ ethoxylated alcohol compound obtained from SABIC are provided in Table 3. The drilling fluid composition of Example 1 had 1 wt. % of the ethoxylated alcohol compound.

TABLE 3

Properties of the Ethoxylated Alcohol Compounds Having C12-C14 Hydrocarbyl Groups

| Property | Value |
|---|---|
| Density measured at 25° C. (g/mL) | 0.905 |
| HLB (calculated) | 4.7 |
| Pour Point (° C.) | 6 |
| Closed Cup Flash Point (° C.) | >150 |
| Viscosity at 25° C. (cP) | 25 |
| Surface Tension of 0.01 wt. % Aqueous Solution at 25° C. (milliNewtons per meter (mN/m) | Insoluble |

The drilling fluid composition of Example 1, having 1 wt. % ethoxylated alcohol compound and no polyaminated fatty acid compound, exhibited a total HTHP fluid loss of 23 mL and a water layer in the HTHP filtrate of 8 mL, as shown in Table 2. The high HTHP fluid loss and high volume of water layer in the HTHP filtrate for the drilling fluid composition of Example 1 indicates that the 1 wt. % ethoxylated alcohol compound by itself did not provide sufficient emulsion stability to the drilling fluid composition of Example 1. As previously described in this disclosure, the LSYP value of the drilling fluid composition provides an indication of the susceptibility of the drilling fluid composition to barite sag. Values of LSYP of greater than 7 lbf/100 ft² are considered acceptable for drilling fluids. The drilling fluid composition of Example 1 exhibited a LSYP value of 3 lbf/100 ft², which is less than 7 lbf/100 ft². Therefore, the low LSYP of Example 1 may indicate susceptibility of the drilling fluid composition of Example 1 to barite sag.

Example 2

Drilling Fluid Composition Having the Polyaminated Fatty Acid Compound

As shown in Table 1, the drilling fluid composition of Example 2 included the polyaminated fatty acid compound as the emulsifier but did not include the ethoxylated alcohol compound. The formulation for the drilling fluid composition of Example 2 was previously provided in Table 1. The polyaminated fatty acid compound of the drilling fluid composition of Example 2 was the reaction product obtained from reactions (RXN2) and (RXN3) previously described in this disclosure. The drilling fluid composition of Example 2 included 0.2 wt. % of the polyaminated fatty acid compound.

The drilling fluid composition of Example 2, having 0.2 wt. % polyaminated fatty acid compound and none of the ethoxylated alcohol compound, exhibited a total HTHP fluid loss of 15 mL and a water layer in the HTHP filtrate of 6 ml, as shown in Table 2. The high HTHP fluid loss and high volume of water layer in the HTHP filtrate for the drilling fluid composition of Example 2 indicates that the 0.2 wt. % of the polyaminated fatty acid compound by itself was unable to provide sufficient emulsion stability to the drilling fluid composition of Example 2. The drilling fluid composition of Example 2 exhibited a LSYP value of 14 lbf/100 ft$^2$, which is greater than the threshold of 7 lbf/100 ft$^2$, which is recommended for drilling fluids, and substantially improved over the drilling fluid composition of Example 1. Therefore, the improved LSYP value of the drilling fluid composition of Example 2 indicates improved resistance to barite sag compared to the drilling fluid composition of Example 1.

Example 3

Drilling Fluid Composition Having the Ethoxylated Alcohol Compound and the Polyaminated Fatty Acid Compound As shown in Table 1, the drilling fluid composition of Example 3 included both the ethoxylated alcohol compound and the polyaminated fatty acid compound. The drilling fluid composition of Example 3 included 1.4 wt. % of the ethoxylated alcohol compound in the drilling fluid composition of Example 1 and 0.2 wt. % of the polyaminated fatty acid compound in the drilling fluid composition of Example 2.

The combination of the ethoxylated alcohol compound and the polyaminated fatty acid compound produced a synergistic effect that improved the emulsion stability of the drilling fluid composition of Example 3 compared to the drilling fluid compositions of Examples 1 and 2. The drilling fluid composition of Example 1 (ethoxylated alcohol compound only) exhibited a total HTHP fluid loss of 23 mL, and the drilling fluid composition of Example 2 (polyaminated fatty acid only) exhibited a total HTHP fluid loss of 15 mL. Based on the HTHP fluid loss results for the drilling fluid compositions of Examples 1 and 2, it would be expected that adding the polyaminated fatty acid compound to the drilling fluid composition of Example 1 would improve the HTHP fluid loss to 15 mL at the most, which is the HTHP fluid loss exhibited by the drilling fluid of Example 2 having the polyaminated fatty acid but not the ethoxylated fatty alcohol. Similarly, it would be expected that adding the ethoxylated alcohol compound to the drilling fluid composition of Example 2 would reduce the HTHP fluid loss performance to a value between 15 mL and 23 mL. However, the drilling fluid composition of Example 3 having both the ethoxylated alcohol compound and the polyaminated fatty acid compound unexpectedly exhibited a total HTHP fluid loss of only 2 mL. No water layer of the HTHP filtrate was observed for the drilling fluid composition of Example 3. The total HTHP fluid loss of 2 mL and no observation of a water layer for the drilling fluid composition of Example 3 are substantial and unexpected improvements in the emulsion stability of the drilling fluid composition of Example 3 compared to the drilling fluid composition of Examples 1 having only the ethoxylated alcohol compound and the drilling fluid composition of Example 2 having only the polyaminated fatty acid compound. Therefore, the synergistic combination of the ethoxylated alcohol compound and the polyaminated fatty acid compound is shown to impart superior emulsion stability to the 90 pcf drilling fluid compositions of Example 3 compared to drilling fluid compositions having the ethoxylated alcohol compound or the polyaminated fatty acid compound but not both.

Further, the combination of the ethoxylated alcohol compound and the polyaminated fatty acid compound in the drilling fluid composition of Example 3 produced a synergistic effect that resulted in an unexpected improvement the YP of the drilling fluid composition of Example 3 compared to the drilling fluid compositions of Examples 1 and 2. The drilling fluid composition of Example 1 having the ethoxylated alcohol compound but not the polyaminated fatty acid compound exhibited a YP of 21 lbf/100 ft$^2$, and the drilling fluid composition of Example 2 having the polyaminated fatty acid compound but not the ethoxylated alcohol compound also exhibited a YP of 21 lbf/100 ft$^2$. Since the YP evaluated for drilling fluid compositions of Examples 1 and 2 are the same, it would be expected that a drilling fluid composition having both the ethoxylated alcohol compound and the polyaminated fatty acid compound would exhibit a YP of about 21 lbf/100 ft$^2$ as well. However, the drilling fluid composition of Example 3 having both the ethoxylated alcohol compound and the polyaminated fatty acid compound exhibited a YP of 37 lbf/100 ft$^2$, which is a 75% improvement in the YP compared to the drilling fluid compositions of Examples 1 and 2. The YP of 37 lbf/100 ft$^2$ for the drilling fluid composition of Example 3 was an unexpected and substantial improvement over the YP of 21 lbf/100 ft$^2$ of the drilling fluid compositions of Examples 1 and 2, each of which did not include both the ethoxylated alcohol compound and the polyaminated fatty acid compound. As previously described in this disclosure, the YP value of the drilling fluid composition indicates the drilling fluid composition's ability to convey rock cuttings from the bottom of a wellbore to the surface (hole-cleaning ability of the drilling fluid composition). The combination of the ethoxylated alcohol compound and the polyaminated fatty acid compound resulted in a YP value of the drilling fluid composition of Example 3 that was unexpectedly and substantially improved compared to the drilling fluid compositions of Examples 1 and 2. Because of the improvement in the YP value, the drilling fluid composition of Example 3 can be expected to have unexpectedly improved hole-cleaning ability compared to the drilling fluid compositions of Examples 1 and 2.

Additionally, the drilling fluid compositions of Example 3 exhibited a LSYP value of 15 lbf/100 ft$^2$, which is greater than the 7 lbf/100 ft$^2$ recommended for drilling fluids. The LSYP of the drilling fluid composition of Example 3 shows improvement over the LYSP values evaluated for the drilling fluid compositions of Examples 1 and 2. The LSYP of the drilling fluid composition of Example 1 was 3 lbf/100 ft², and the LSYP for the drilling fluid composition of Example 2 was 14 lbf/100 ft². As previously discussed in this disclosure, the LSYP of the drilling fluid compositions is related to the resistance of the drilling fluid composition to barite sag. Therefore, the improved LSYP value achieved by the drilling fluid composition of Example 3 indicates improved resistance to barite sag compared to the drilling fluid compositions of Examples 1 and 2.

A first aspect of the present disclosure may be directed to an invert emulsion fluid comprising an oleaginous phase, an aqueous phase dispersed in the oleaginous phase, and an emulsifier composition comprising: an ethoxylated alcohol compound having formula (I):

$$R^1-(OCH_2CH_2)_n-OH \qquad (I)$$

where $R^1$ is a hydrocarbyl group having from 8 to 22 carbon atoms and n is an integer from 1 to 8, where the ethoxylated alcohol compound has a Hydrophilic-Lipophilic Balance (HLB) of less than or equal to 6; and a polyaminated fatty acid compound having formula (II):

$$R^2-CO-NH-CH_2-CH_2-N(COR^2)-CH_2-CH_2-NH-CO-R^3 \qquad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms.

A second aspect of the present disclosure may include the first aspect where $R^1$ is a saturated linear hydrocarbyl group.

A third aspect of the present disclosure may include the first and second aspects where $R^1$ has from 12 to 14 carbon atoms.

A fourth aspect of the present disclosure may include the first through third aspects where n is 1.

A fifth aspect of the present disclosure may include the first through fourth aspects where $R^2$ is a saturated linear hydrocarbyl group.

A sixth aspect of the present disclosure may include the first through fourth aspects where $R^2$ is an unsaturated hydrocarbyl group.

A seventh aspect of the present disclosure may include the first through fourth aspects where $R^2$ is a branched hydrocarbyl group.

An eighth aspect of the present disclosure may include the first through seventh aspects where $R^3$ is a hydrocarbyl group.

A ninth aspect of the present disclosure may include the first through eighth aspects where $R^3$ is an unsaturated hydrocarbyl group.

A tenth aspect of the present disclosure may include the first through seventh aspects where $R^3$ is a an alkylene carboxylate group having formula $-R^4-COOH$, where $R^4$ is a saturated or unsaturated hydrocarbylene.

An eleventh aspect of the present disclosure may include the first through seventh aspects where $R^3$ is selected from the group consisting of methyl, phenyl, $-CH_2CH_2-COOH$, and $-CH=CH-COOH$.

A twelvth aspect of the present disclosure may include the first through seventh aspects where $R^3$ is $-CH=CH-COOH$.

A thirteenth aspect of the present disclosure may include the first through twelvth aspects comprising from 0.25 pounds of mass per barrel (lbm/bbl) to 25 lbm/bbl ethoxylated alcohol compound.

A fourteenth aspect of the present disclosure may include the first through thirteenth aspects comprising from 0.25 lbm/bbl to 25 lbm/bbl polyaminated fatty acid compound.

A fifteenth aspect of the present disclosure may include the first through fourteenth aspects where a weight ratio of the ethoxylated alcohol compound to the polyaminated fatty acid compound is from 1:99 to 99:1, or from 50:50 to 99:1, or from 70:30 to 99:1, or from 70:30 to 95:5, or from 80:20 to 95:5.

A sixteenth aspect of the present disclosure may include the first through fifteenth aspects further comprising an alkali compound.

A seventeenth aspect of the present disclosure may include the sixteenth aspect comprising from 0.5 lbm/bbl to 10 lbm/bbl alkali compound.

An eighteenth aspect of the present disclosure may include the sixteenth and seventeenth aspects where the alkali compound comprises lime.

A nineteenth aspect of the present disclosure may include the first through fifteenth aspects and may be directed to a drilling fluid composition comprising an invert emulsion fluid according to any of the first through fifteenth aspects and a weighting material in the invert emulsion fluid.

A twentieth aspect of the present disclosure may include the nineteenth aspect comprising from 4 lbm/bbl to 700 lbm/bbl weighting material.

A twenty-first aspect of the present disclosure may include the nineteenth and twentieth aspects further comprising from 0.5 lbm/bbl to 120 lbm/bbl calcium chloride.

A twenty-second aspect of the present disclosure may include the nineteenth through twenty-first aspects, comprising an aqueous phase salinity of from 10 wt. % to 40 wt. %, based on the total weight of the aqueous phase of the invert emulsion fluid.

A twenty-third aspect of the present disclosure may include the nineteenth through twenty-second aspects further comprising at least one additive chosen from an organoclay, a rheology modifier, a filtration control agent, an alkali compound, or combinations of these.

A twenty-fourth aspect of the present disclosure may be directed to an emulsifier composition comprising: an ethoxylated alcohol compound having formula (I):

$$R^1-(OCH_2CH_2)_n-OH \qquad (I)$$

where $R^1$ is a hydrocarbyl group having from 8 to 22 carbon atoms and n is an integer from 1 to 8, the ethoxylated alcohol compound having a Hydrophilic-Lipophilic Balance (HLB) of less than or equal to 6; and a polyaminated fatty acid compound having formula (II):

$$R^2-CO-NH-CH_2-CH_2-N(COR^2)-CH_2-CH_2-NH-CO-R^3 \qquad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms.

A twenty-fifth aspect of the present disclosure may include the twenty-fourth aspect where $R^1$ is a saturated linear hydrocarbyl group.

A twenty-sixth aspect of the present disclosure may include the twenty-fourth and twenty-fifth aspects where $R^1$ has from 12 to 14 carbon atoms.

A twenty-seventh aspect of the present disclosure may include the twenty-fourth through twenty-sixth aspects where n is 1.

A twenty-eighth aspect of the present disclosure may include the twenty fourth through twenty-seventh aspects where $R^2$ is a saturated linear hydrocarbyl group.

A twenty-ninth aspect of the present disclosure may include the twenty-fourth through twenty-seventh aspects where $R^2$ is an unsaturated hydrocarbyl group.

A thirtieth aspect of the present disclosure may include the twenty-fourth through twenty-seventh aspects where $R^2$ is a branched hydrocarbyl group.

A thirty-first aspect of the present disclosure may include the twenty-fourth through thirtieth aspects where a weight ratio of the ethoxylated alcohol compound to the polyaminated fatty acid compound is from 1:99 to 99:1, or from 50:50 to 99:1, or from 70:30 to 99:1, or from 70:30 to 95:5, or from 80:20 to 95:5.

A thirty-second aspect of the present disclosure may be directed to a drilling fluid composition comprising: an invert emulsion comprising an aqueous phase dispersed in an oleaginous phase and a emulsifier composition comprising: an ethoxylated alcohol compound having formula (I):

$$R^1—(OCH_2CH_2)_n—OH \tag{I}$$

where $R^1$ is a hydrocarbyl group having from 8 to 22 carbon atoms and n is an integer from 1 to 6, the ethoxylated alcohol compound having a Hydrophilic-Lipophilic Balance (HLB) of less than or equal to 6; and a polyaminated fatty acid compound having formula (II):

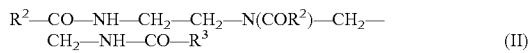
$$R^2—CO—NH—CH_2—CH_2—N(COR^2)—CH_2—CH_2—NH—CO—R^3 \tag{II}$$

where $R^2$ is hydrocarbyl group having from 1 to 20 carbon atoms and $R^3$ is a hydrocarbyl group having 1 to 10 carbon atoms or an alkylene carboxylate group having formula —$R^4$—COOH, where $R^4$ is a saturated or unsaturated hydrocarbylene having from 1 to 10 carbon atoms; and a weighting material.

A thirty-third aspect of the present disclosure may include the thirty-second aspect where $R^1$ is a saturated linear hydrocarbyl group.

A thirty-fourth aspect of the present disclosure may include the thirty-second and thirty-third aspects where $R^1$ has from 12 to 14 carbon atoms.

A thirty-fifth aspect of the present disclosure may include the thirty-second through thirty-fourth aspects where n is 1.

A thirty-sixth aspect of the present disclosure may include the thirty-second through thirty-fifth aspects where $R^2$ is a saturated linear hydrocarbyl group.

A thirty-seventh aspect of the present disclosure may include the thirty-second through thirty-fifth aspects where $R^2$ is an unsaturated hydrocarbyl group.

A thirty-eighth aspect of the present disclosure may include the thirty-second through thirty-fifth aspects where $R^2$ is a branched hydrocarbyl group.

A thirty-ninth aspect of the present disclosure may include the thirty-second through thirty-fifth aspects comprising from 0.25 lbm/bbl to 25 lbm/bbl ethoxylated alcohol compound.

A fortieth aspect of the present disclosure may include the thirty-second through thirty-ninth aspects comprising from 0.25 lbm/bbl to 25 lbm/bbl polyaminated fatty acid compound.

A forty-first aspect of the present disclosure may include the thirty-second through fortieth aspects where a weight ratio of the ethoxylated alcohol compound to the polyaminated fatty acid compound is from 1:99 to 99:1, or from 50:50 to 99:1, or from 70:30 to 99:1, or from 70:30 to 95:5, or from 80:20 to 95:5.

A forty-second aspect of the present disclosure may include the thirty-second through forty-first aspects further comprising an alkali compound.

A forty-third aspect of the present disclosure may include the forty-second aspect comprising from 0.5 lbm/bbl to 10 lbm/bbl alkali compound.

A forty-fourth aspect of the present disclosure may include the forty-second through forty-third aspects where the alkali compound comprises lime.

A forty-fifth aspect of the present disclosure may include the thirty-second through forty-fourth aspects comprising from 4 lbm/bbl to 700 lbm/bbl weighting material.

A forty-sixth aspect of the present disclosure may include the thirty-second through forty-fifth aspects comprising from 150 lbm/bbl to 330 lbm/bbl invert emulsion fluid based on the total weight of the drilling fluid composition.

A forty-seventh aspect of the present disclosure may include the thirty-second through forty-sixth aspects where the invert emulsion fluid comprises a volume ratio of the oleaginous phase to the aqueous phase of from 50:50 to 95:5.

A forty-eighth aspect of the present disclosure may include the thirty-second through forty-seventh aspects further comprising calcium chloride.

A forty-ninth aspect of the present disclosure may include the forty-eighth aspect comprising from 0.5 lbm/bbl to 120 lbm/bbl calcium chloride.

A fiftieth aspect of the present disclosure may include the thirty-second through forty-ninth aspects comprising an aqueous phase salinity of from 10 wt. % to 40 wt. %, based on the total weight of the aqueous phase of the invert emulsion fluid.

A fifty-first aspect of the present disclosure may include the thirty-second through fiftieth aspects further comprising at least one additive chosen from an organoclay, a rheology modifier, a filtration control agent, an alkali compound, or combinations of these.

A fifty-second 52 aspect of the present disclosure may be directed to a method of drilling a subterranean well, the method comprising: operating a drill in a wellbore in the presence of a drilling fluid composition comprising a weighting material and an invert emulsion fluid, the invert emulsion fluid comprising an oleaginous phase, an aqueous phase dispersed in the oleaginous phase, and an emulsifier composition comprising: an ethoxylated alcohol compound having formula (I):

$$R^1—(OCH_2CH_2)_n—OH \tag{I}$$

where $R^1$ is a hydrocarbyl group having from 8 to 22 carbon atoms and n is an integer from 1 to 6, the ethoxylated alcohol compound having a Hydrophilic-Lipophilic Balance (HLB) of less than or equal to 6; and a polyaminated fatty acid compound having formula (II):

$$R^2—CO—NH—CH_2—CH_2—N(COR^2)—CH_2—CH_2—NH—CO—R^3 \tag{II}$$

where $R^2$ is hydrocarbyl group having from 1 to 20 carbon atoms and $R^3$ is a hydrocarbyl group having 1 to 10 carbon atoms or an alkylene carboxylate group having formula —$R^4$—COOH, where $R^4$ is a saturated or unsaturated hydrocarbylene having from 1 to 10 carbon atoms.

A fifty-third aspect of the present disclosure may include the fifty-second aspect where $R^1$ is a saturated linear hydrocarbyl group.

A fifty-fourth aspect of the present disclosure may include the fifty-second through fifty-third aspects where $R^1$ has from 12 to 14 carbon atoms.

A fifty-fifth aspect of the present disclosure may include the fifty-second through fifty-fourth aspects where n is 1.

A fifty-sixth aspect of the present disclosure may include the fifty-second through fifty-fifth aspects where $R^2$ is a saturated linear hydrocarbyl group.

A fifty-seventh aspect of the present disclosure may include the fifty-second through fifty-sixth aspects where $R^2$ is an unsaturated hydrocarbyl group.

A fifty-eighth aspect of the present disclosure may include the fifty-second through fifty-seventh aspects where $R^2$ is a branched hydrocarbyl group.

A fifty-ninth aspect of the present disclosure may include the fifty-second through fifty-eighth aspects comprising from 0.25 lbm/bbl to 25 lbm/bbl ethoxylated alcohol compound.

A sixtieth aspect of the present disclosure may include the fifty-second through fifty-ninth aspects where the drilling fluid composition comprises from 0.25 lbm/bbl to 25 lbm/bbl of the polyaminated fatty acid compound.

A sixty-first aspect of the present disclosure may include the fifty-second through sixtieth aspects where a weight ratio of the ethoxylated alcohol compound to the polyaminated fatty acid compound in the drilling fluid composition is from 1:99 to 99:1, or from 50:50 to 99:1, or from 70:30 to 99:1, or from 70:30 to 95:5, or from 80:20 to 95:5.

A sixty-second aspect of the present disclosure may include the fifty-second through sixty-first aspects where the drilling fluid composition further comprises calcium chloride.

A sixty-third aspect of the present disclosure may include the fifty-second through sixty-second aspects where the drilling fluid composition comprises an aqueous phase salinity of from 10 wt. % to 40 wt. %, based on the weight of the aqueous phase of the invert emulsion fluid.

A sixty-fourth aspect of the present disclosure may include the fifty-second through sixty-third aspects where the drilling fluid composition comprises at least one additive chosen from an organoclay, a rheology modifier, a filtration control agent, an alkali compound, or combinations of these.

A sixty-fifth aspect of the present disclosure may include the fifty-second through sixty-third aspects where the drilling fluid composition comprises from 0.5 lbm/bbl to 10 lbm/bbl alkali compound.

A sixty-sixth aspect of the present disclosure may include the sixty-fifth aspect where the alkali compound comprises lime.

A sixty-seventh aspect of the present disclosure may be directed to a method for increasing the emulsion stability of a drilling fluid composition, the method comprising introducing an emulsifier composition to the drilling fluid composition comprising a weighting material and an invert emulsion fluid, the invert emulsion fluid comprising an oleaginous phase, and an aqueous phase dispersed in the oleaginous phase, the emulsifier composition comprising: an ethoxylated alcohol compound having formula (I):

$$R^1-(OCH_2CH_2)_n-OH \quad (I)$$

where $R^1$ is a hydrocarbyl group having from 8 to 22 carbon atoms and n is an integer from 1 to 6, the ethoxylated alcohol compound having a Hydrophilic-Lipophilic Balance (HLB) of less than or equal to 6; and a polyaminated fatty acid compound having formula (II):

$$R^2-CO-NH-CH_2-CH_2-N(COR^2)-CH_2-CH_2-NH-CO-R^3 \quad (II)$$

where $R^2$ is hydrocarbyl group having from 1 to 20 carbon atoms and $R^3$ is a hydrocarbyl group having 1 to 10 carbon atoms or an alkylene carboxylate group having formula $-R^4-COOH$, where $R^4$ is a saturated or unsaturated hydrocarbylene having from 1 to 10 carbon atoms.

A sixty-eighth aspect of the present disclosure may include the sixty-seventh aspect further comprising operating a drill in a wellbore in the presence of the drilling fluid composition.

A sixty-ninth aspect of the present disclosure may include the sixty-eighth aspect where the emulsifier composition is introduced to the drilling fluid composition while operating the drill in the wellbore in the presence of the drilling fluid composition.

A seventieth aspect of the present disclosure may include the sixty-eighth aspect further comprising adding the ethoxylated alcohol compound or the polyaminated fatty acid compound to the drilling fluid composition while operating the drill in the wellbore in the presence of the drilling fluid composition.

For the purposes of defining the present technology, the transitional phrase "consisting of" may be introduced in the claims as a closed preamble term limiting the scope of the claims to the recited components or steps and any naturally occurring impurities.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. An invert emulsion fluid comprising an oleaginous phase, an aqueous phase dispersed in the oleaginous phase, and an emulsifier composition comprising:

1.4 wt. % of an ethoxylated alcohol compound having formula (I):

where $R^1$ is a hydrocarbyl group having from 12 to 14 carbon atoms and n is 1, where the ethoxylated alcohol compound has a Hydrophilic-Lipophilic Balance (HLB) of less than or equal to 6; and 0.2 wt. % of a polyaminated fatty acid compound having formula (II):

where $R^2$ is hydrocarbyl group having from 1 to 20 carbon atoms and $R^3$ is an alkylene carboxylate group having formula $-R^4-COOH$, where $R^4$ is a saturated or unsaturated hydrocarbylene having 2 carbon atoms.

2. The invert emulsion fluid of claim 1 where $R^1$ is a saturated linear hydrocarbyl group.

3. The invert emulsion fluid of claim 1 where $R^2$ is a saturated linear hydrocarbyl group.

4. The invert emulsion fluid of claim 1 where R is selected from the group consisting of $-CH_2CH_2-COOH$ and $-CH=CH-COOH$.

5. The invert emulsion fluid of claim 1 further comprising from 0.5 lbm/bbl to 10 lbm/bbl alkali compound.

* * * * *